(12) United States Patent
Zhang

(10) Patent No.: US 11,394,068 B2
(45) Date of Patent: Jul. 19, 2022

(54) ELECTROLYTE LEAKAGE MANAGEMENT IN AN ELECTROCHEMICAL CELL

(71) Applicant: e-Zn Inc., Toronto (CA)

(72) Inventor: Xiaoge Gregory Zhang, Toronto (CA)

(*) Notice: Subject to any disclaimer, the term of this patent is extended or adjusted under 35 U.S.C. 154(b) by 0 days.

(21) Appl. No.: 17/104,692

(22) Filed: Nov. 25, 2020

(65) Prior Publication Data

US 2022/0166088 A1    May 26, 2022

(51) Int. Cl.
   *H01M 12/02*      (2006.01)
   *H01M 12/08*      (2006.01)
               (Continued)

(52) U.S. Cl.
    CPC .............. *H01M 12/02* (2013.01); *H01M 4/86* (2013.01); *H01M 12/08* (2013.01); *H01M 50/1385* (2021.01)

(58) Field of Classification Search
    CPC ........ H01M 12/02; H01M 12/08; H01M 4/86; H01M 50/1385
    See application file for complete search history.

(56) References Cited

U.S. PATENT DOCUMENTS

| | | |
|---|---|---|
| 3,758,342 A | 9/1973 | Baba |
| 3,879,225 A | 4/1975 | Backhurst et al. |
| | (Continued) | |

FOREIGN PATENT DOCUMENTS

| | | |
|---|---|---|
| WO | WO 2011/073975 A2 | 2/2011 |
| WO | WO 2015/028887 A1 | 3/2015 |

OTHER PUBLICATIONS

Butler, et al. 2002 "Zinc/bromine batteries" in *Handbook of Batteries, Third Edition*: chapter 39; pp. 39.1-39.5; David Linden and Thomas B. Reddy Eds, McGraw-Hill.

(Continued)

*Primary Examiner* — Eugenia Wang
(74) *Attorney, Agent, or Firm* — Brunet & Co. Ltd.; Robert Brunet; Hans Koenig

(57) ABSTRACT

Described herein are methods, air cathodes or electrochemical cell systems configured to reduce or alleviate leakage of electrolyte within air cathodes. A method for electrolyte leakage management in an electrochemical cell system includes: configuring a plurality of air cathodes within an electrochemical cell system, each of the plurality of air cathodes comprising a frame, a membrane oxygen electrode attached to the frame to define a sealed interior cavity, an air inlet communicative with the interior cavity, a liquid outlet communicative with the interior cavity; positioning the liquid outlet lower than the air inlet; and draining electrolyte leakage from the interior cavity through the liquid outlet. An electrochemical cell system configured for electrolyte leakage management includes: a housing; an electrolyte disposed in the housing; a metallic material, when positioned in the first spaces, forms one or more discharging anodes; one or more charging anodes and one or more charging cathodes at least partially immersed in the electrolyte; and one or more air cathodes immersed in the electrolyte and one or more first spaces between the oxygen cathodes, each of the one or more air cathodes comprising 1) a frame, 2) a membrane oxygen electrode attached to the frame to define an interior cavity, 3) an air inlet communicative with the interior cavity, 4) an air outlet communicative with the interior cavity, 5) a liquid outlet communicative with the interior cavity, 6) the liquid outlet positioned lower than the air inlet.

8 Claims, 21 Drawing Sheets

(51) Int. Cl.
  *H01M 4/86* (2006.01)
  *H01M 50/138* (2021.01)

(56) References Cited

U.S. PATENT DOCUMENTS

| | | | |
|---|---|---|---|
| 3,977,903 | A | 8/1976 | Jacquelin |
| 3,981,747 | A | 9/1976 | Doniat et al. |
| 4,126,733 | A | 11/1978 | Doniat |
| 4,147,839 | A | 4/1979 | Solomon et al. |
| 4,172,924 | A | 10/1979 | Warszawski |
| 4,198,475 | A | 4/1980 | Zaromb |
| 4,341,847 | A | 7/1982 | Sammells |
| 4,719,156 | A | 1/1988 | Niksa et al. |
| 5,006,424 | A | 4/1991 | Evans et al. |
| 5,196,275 | A | 3/1993 | Goldman et al. |
| 5,208,526 | A | 5/1993 | Goldman et al. |
| 5,434,020 | A | 7/1995 | Cooper |
| 5,607,788 | A | 3/1997 | Tomazic |
| 5,849,427 | A | 12/1998 | Siu et al. |
| 5,952,117 | A | 9/1999 | Colborn et al. |
| 6,706,433 | B2 | 3/2004 | Pinto |
| 8,236,440 | B2 | 8/2012 | Bendert |
| 8,293,390 | B2 | 10/2012 | Winter |
| 2004/0053132 | A1 | 3/2004 | Smedley |
| 2004/0140222 | A1 | 7/2004 | Smedley |
| 2010/0002130 | A1 | 1/2010 | Kamio |
| 2010/0021303 | A1 | 1/2010 | Nielsen et al. |
| 2010/0031693 | A1 | 2/2010 | Yuyama |
| 2010/0196768 | A1 | 8/2010 | Roberts et al. |
| 2010/0316935 | A1 | 12/2010 | Friesen |
| 2010/0330437 | A1 | 12/2010 | Burchardt |
| 2011/0117456 | A1 | 5/2011 | Kim et al. |
| 2013/0025206 | A1 | 1/2013 | Suzuki |
| 2013/0252062 | A1 | 9/2013 | Wilkins et al. |
| 2013/0280623 | A1 | 10/2013 | Yoshida et al. |
| 2013/0285597 | A1 | 10/2013 | Goldstein |
| 2014/0065460 | A1 | 3/2014 | Evans |
| 2015/0056524 | A1* | 2/2015 | Zhang ................ H01M 12/065 429/404 |

OTHER PUBLICATIONS

Cooper 1995 "Powering Future Vehicles with Refuelable Zinc/Air Battery", *Science & Technology Review*, Oct. 1995: pp. 6-13.

Skyllas-Kazacos, et al. 2011 "Progress in flow battery research and development" *Journal of the Electrochemical Society* 158(8): R55-R79.

Smedley and Zhang, et al. 2009 "Zinc-air: Hydraulic recharge" in *Encyclopedia of Electrochemical Power Sources*, Eds. Jungen Garch et al. Amsterdam, Elsevier (in 12 pages).

Zhang 1996 "Corrosion and electrochemistry of zinc" Springer, Plenum Press, New York, Chapter 1, pp. 1-3; and Chapter 14: 373-376 (in 8 pages).

Zhang 2009 "Secondary batteries—Zinc systems" in *Encyclopedia of Electrochemical Power Sources*, Eds. Jungen Garch et al. Amsterdam, in 16 pages.

Zhang 2015 "A dual power cell for storing electricity in zinc metal," *Journal of Power Sources* 285: 580-587.

\* cited by examiner

PRIOR ART

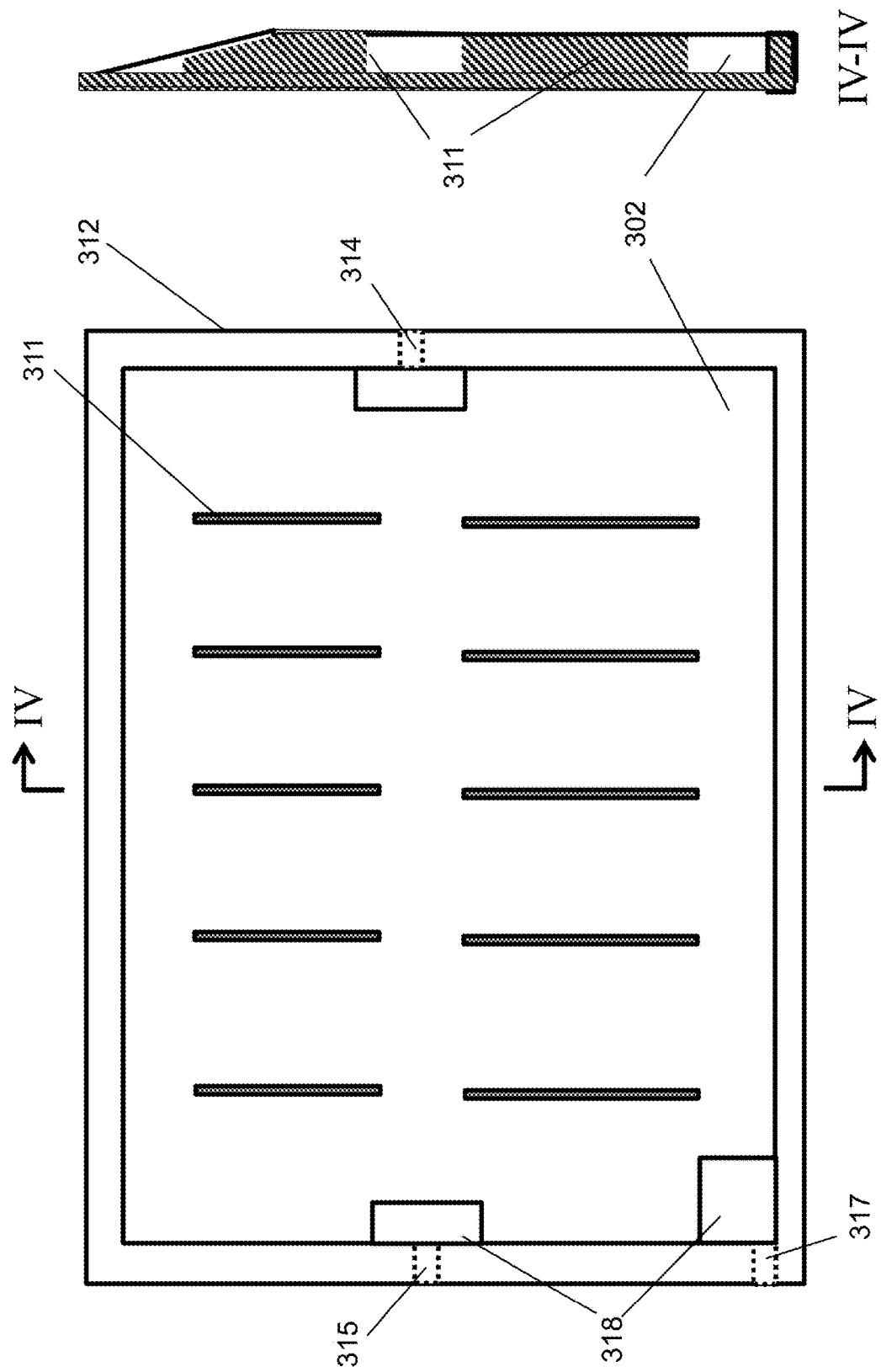

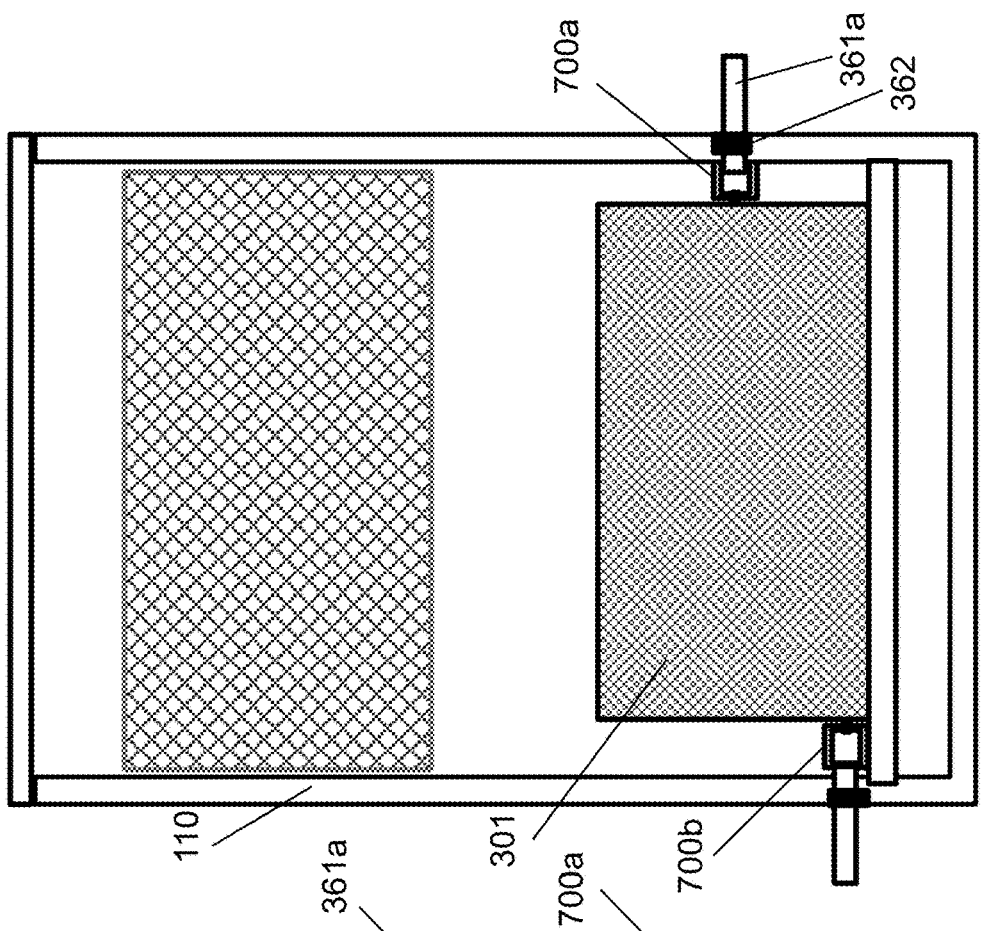
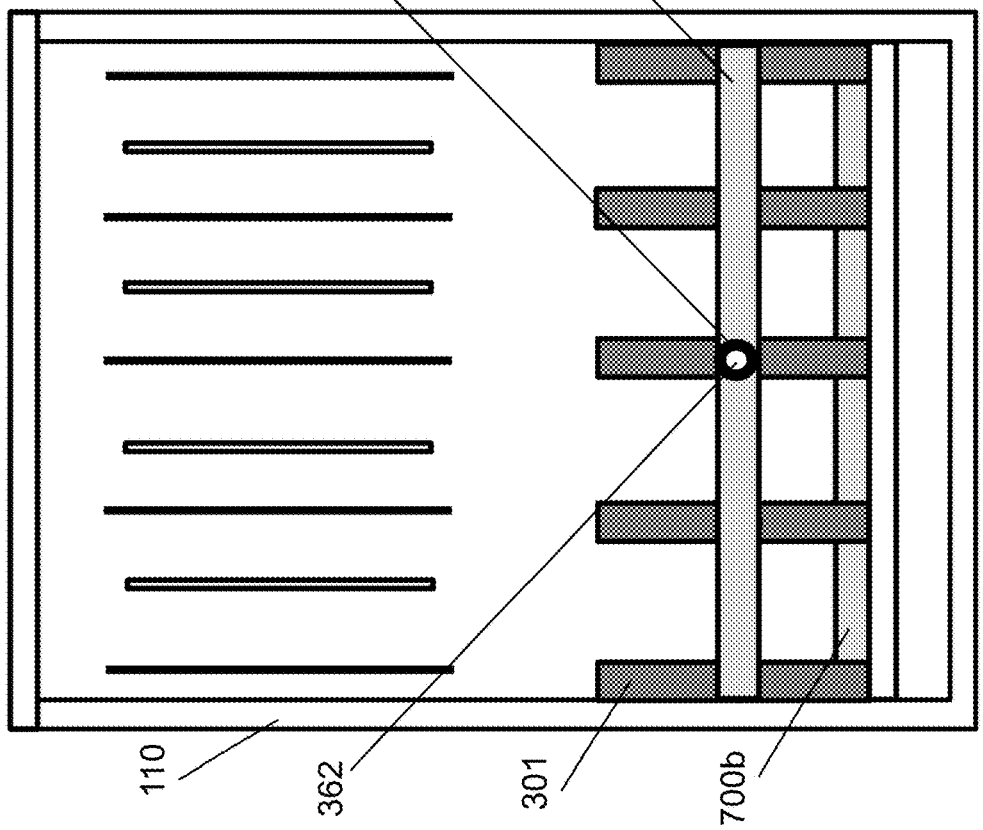

ELECTROLYTE LEAKAGE MANAGEMENT IN AN ELECTROCHEMICAL CELL

BACKGROUND OF THE INVENTION

Field of the Invention

The present invention relates to an air cathode, and more particularly relates to air cathodes for use in electrochemical power sources such as fuel cells or batteries.

Description of the Related Art

Metal-air, particularly zinc-air, electrochemical systems have been seen as promising technologies for low cost large scale energy storage. There have been continuous attempts to develop energy storage systems based on zinc-air chemistry including rechargeable batteries, mechanically and hydraulically rechargeable fuel cells (see review articles by X. G. Zhang: "Zinc Electrodes", and S. Smedley and X. G. Zhang, "Zinc-Air: Hydraulic Recharge", in Encyclopedia of Electrochemical Power Sources, Eds. Jungen Garche etc., Amsterdam: Elsevier, 2009).

Electrically rechargeable metal-air batteries have high energy density. Technical problems can include degradation of the bi-functional air cathode and the detrimental change of the morphology of metal anode during cyclic discharging and charging.

For metal-air fuel cells, the metallic active anode material is like fuel and can be generated and regenerated by electro deposition. The generation of metallic material by electro deposition serves the function of storing electricity. The deposited metallic material together with electrolyte in liquid form is fed or fueled into the fuel cells, which serves the function of generating electricity from the stored energy in the metallic material.

Regenerative metal-air fuel cell systems have advantages over rechargeable battery systems such as independent scaling of power and capacity and continuous discharging without interruption for charging. Technical problems can include clogging or jamming during fueling or transporting the zinc materials into and out the electrochemical cells and uneven distribution of the materials within a cell and between the cells.

PCT Publication WO2015/028887 (published 5 Mar. 2015) disclosed several functional solutions to benefit electrochemical power sources such as rechargeable batteries, regenerative fuel cell systems and/or redox flow batteries— one such functional solution being a novel air cathode comprising a frame covered with one or more oxygen membrane electrodes, a cavity enclosed by the oxygen membrane electrode(s), one or more separators covering the surface of the oxygen membrane electrode(s), and an inlet and an outlet for passing air or an oxygen-containing gas into and out of the cavity. This novel air cathode advantageously functions to allow independent removal of an individual air cathode without affecting other cathodes in the discharging assembly, and thus allowing convenient changing of cathodes or cleaning of the cell container when needed.

Development of this air cathode has potential to yield further improvements.

As electricity storage is an important enabling technology for effective use of renewable energy sources and such technology is prioritized by government and industry alike, there is a continuing need for improvements to or alternatives to conventional air cathodes.

SUMMARY OF THE INVENTION

In an aspect there is provided, an air cathode comprising: a frame; a membrane oxygen electrode attached to the frame to define an interior cavity; an air inlet communicative with the interior cavity; an air outlet communicative with the interior cavity; a liquid outlet communicative with the interior cavity; the liquid outlet positioned lower than the air inlet.

In another aspect there is provided, an air cathode comprising: a frame comprising a convex top surface; a single membrane oxygen electrode attached to first and second opposing sides of the frame and attached to the convex top surface in between the first and second opposing sides of the frame to define an interior cavity; an air inlet communicative with the interior cavity; an air outlet communicative with the interior cavity.

In another aspect there is provided, a method for electrolyte leakage management of an air cathode in an electrochemical cell system comprising: configuring an air cathode comprising a liquid outlet as described herein within an electrochemical cell system; and draining electrolyte leakage through the liquid outlet.

In another aspect there is provided, a method for electrolyte leakage management in an electrochemical cell system comprising: configuring a plurality of air cathodes within an electrochemical cell system, each of the plurality of air cathodes comprising a frame, a membrane oxygen electrode attached to the frame to define a sealed interior cavity, an air inlet communicative with the interior cavity, a liquid outlet communicative with the interior cavity; positioning the liquid outlet lower than the air inlet; and draining electrolyte leakage from the interior cavity through the liquid outlet.

In another aspect there is provided, an electrochemical cell system, comprising: a container housing the electrochemical cell system; an electrolyte disposed in the container; a plurality of air cathodes immersed in the electrolyte and a plurality of first spaces between the air cathodes, each of the air cathodes comprising 1) a frame, 2) a membrane oxygen electrode attached to the frame to define an interior cavity, 3) an air inlet communicative with the interior cavity, 4) an air outlet communicative with the interior cavity; a mechanism for drainage of electrolyte leaked into the interior cavity of air cathodes comprising 1) a reservoir, 2) a liquid outlet communitive with the interior cavity and with the reservoir, 3) a pump communitive with the reservoir and with the housing through a tubing; and a metallic material, when placed in the first spaces, forms one or more discharging anodes.

BRIEF DESCRIPTION OF THE DRAWINGS

FIG. 8A shows a side view and FIG. 8B shows a cross-section view of another variant air cathode frame including a liquid outlet;

FIG. 11A shows an end view and FIG. 11B shows a side view of a plurality of air cathodes—including manifold configuration of liquid outlets and manifold arrangement of air inlets—installed as a discharging assembly in an electrochemical cell system;

DETAILED DESCRIPTION OF PREFERRED EMBODIMENTS

With reference to the drawings, improvements to air cathodes will now be described. An air cathode typically comprises a frame covered with one or more oxygen membrane electrodes, a cavity enclosed by the oxygen membrane electrode(s), one or more separators covering the surface of the oxygen membrane electrode(s), and an inlet and an outlet for passing air or an oxygen-containing gas into and out of the cavity. As the air cathode can be operational with air or any gas of suitable oxygen concentration (partial pressure), the air cathode may be referred to as an oxygen cathode, and the terms air cathode and oxygen cathode may be used interchangeably. Oxygen membrane electrode may also be referred to as gas diffusion electrode in the field.

Figure 1:
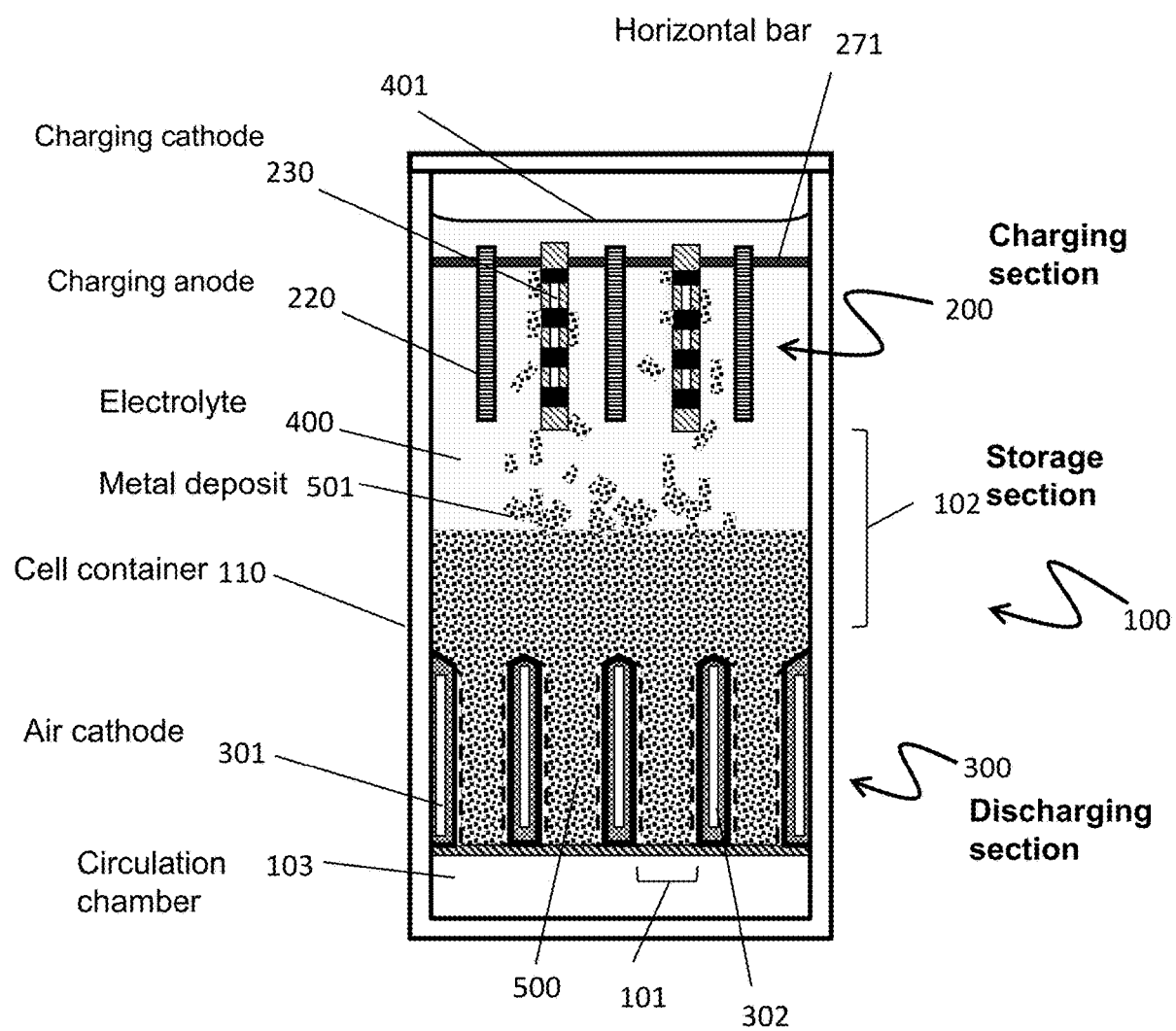
FIG. 1 shows an example of an electrochemical cell including a plurality of charging anodes and cathodes configured to form a charging assembly and a plurality of air cathodes configured to form a discharging assembly.

An example of an operational environment of an air cathode, as installed in electrochemical cell 100, is shown in FIG. 1—previously described in greater detail in PCT Publication WO2015/028887 (published 5 Mar. 2015) and briefly summarized here to provide operational context.

The electrochemical cell 100 includes a charging assembly 200, a discharging assembly 300, an electrolyte 400, a housing or container 110.

The charging assembly 200 is located on the top section of the container 110 above the discharging assembly. The charging assembly 200 comprises one or more charging cathodes 230 and anodes 220, (two cathodes and three anodes are illustrated in the figures for simplicity). The charging cathodes and anodes are appropriately spaced to match a layout of the discharging assembly 300. The cathodes and anodes of the charging assembly are physically secured on a horizontal bar 271 that provides a support/substrate for maintaining position of the charging cathodes and anodes within container 110. Horizontal bar 271 is secured onto the container 110 through an attachment fixture, for example and not limited to a screw or aperture. The cathodes and anodes may alternatively be mounted directly on the cell container 110. The cathodes comprise a conductive material, for example and not limited to magnesium, that is stable in the electrolyte and has low adhesion to the deposited metallic material.

During charging operation the metal in the electrolyte is reduced on the surfaces of the cathodes forming metal deposit 501. As the deposits grow on a surface of the charging cathode 230, they are periodically dislodged from the surfaces and transported by gravity downward into first space 101 (each of the plurality of first spaces 101 defines anode beds between two neighboring air cathodes 301 for containing fallen metal deposit 501 to form a discharging anode 500) between the air cathodes 301 of the discharging assembly 300 underneath the charging assembly. The metal deposits 501 may pile up into second space 102 to variable heights above of the discharging assembly after the first space 101 is filled. The first space 101 may also be described as that below the top edges of the air cathodes 301 or that amid of the air cathodes and the interior surface of the container for the case where the shape of the air cathode is non-planar.

The discharging assembly 300, located beneath of the charging assembly 200, comprises one or a plurality of air cathodes 301 (discharging cathodes) with first space 101 defining an anode bed for containing anode 500 (discharging anodes) comprising the deposited metallic material 501 fallen from the charging assembly. The current of the anodes is collected by any suitable anode current collector which are in turn communicative with any convenient set of bus and lead elements to conduct current to a terminal disposed to the outside of the electrochemical cell 100. Similarly, the current of the air cathodes is conducted to a terminal disposed to the outside of the cell 100 by operably communicative collector, bus and/or lead elements as suited to a particular implementation.

The discharging assembly 300 and the charging assembly 200 may be housed in the same body of electrolyte in a single container to form a cell, and the discharging assembly can be located underneath of the charging assembly or on the side of the charging assembly. Alternatively, the discharging assembly and charging assembly may be housed in separate containers as desired. But, regardless of the discharging assembly being housed in the container alone or in combination with the charging assembly, the discharging assembly will be immersed in the same body of electrolyte such that the plurality of air cathodes 301 and the intervening first space(s) 101 are all immersed in the same body of electrolyte. The anodic electrode (negative electrode) of the discharging assembly may be considered as consisting of one anode when all the metallic material in the anode beds in the first spaces is a continuous body of metallic material and alternatively may be considered as a plurality of anodes when the anode beds are only partially filled by the metallic material.

The air cathode 301 in the discharging assembly 300 is a planar structure with a cavity 302 as illustrated in FIG. 1. As described in PCT Publication WO2015/028887 (published 5 Mar. 2015) the air cathode comprises a frame covered with two membrane oxygen electrodes that are permeable to air but is impermeable to water. The surfaces of the oxygen cathodes are covered with a separator to prevent direct contact between the cathodes and anodes. The cavity 302 within the air cathode is for holding air or oxygen or a gas containing oxygen to allow the reduction of oxygen. The cavity is completely sealed except for an inlet and an outlet to allow air or gas passing through.

The cell container 110 (or tank) can be made of plastic materials. Preferably, the container is made of a continuous piece of plastic material with no discontinuity, such as holes and gaps, existing below the surface 401 of electrolyte such that there is no possibility of electrolyte leakage to outside of the cell. This is a particular advantage over the conventional designs of metal-air cells, in which the sides of cell container are covered by air electrodes and are prone to leaking of electrolyte. The outer surface of the container may be configured as desired to support elements for electrical conduction, air circulation or electrolyte circulation, such as terminals for electrical conduction, air inlet and outlet, a motor or an air pump. The dimension and shape of the container 110 is determined according to the actual designs of the charging and discharging assemblies. The height of the cell container can be varied to change the space 102 (second space) without affecting the structures of the charging and discharging assemblies of the cell. This flexible variation of the second space that changes the volume between the charging and the discharging assemblies allows for variation of energy storage capacities with only marginal impact on the manufacturing and cost of the cell. As metallic material can be contained in the second space above the discharging assembly, the cell can have a large storage capacity or long runtime.

During the discharging operation of the cell, the anodes 500 are consumed as the metal deposit is dissolved and the dissolved metal in the electrolyte is transported out of the anode spaces with electrolyte via diffusion and convection and returns to the charging assembly. The material 501 in the second space 102 above the anodes 500 falls into the anode spaces as the solid anode material is consumed, which maintains the electrochemical activity of the anodes.

At all times during an operational state, the air cathode will be at least partially immersed in electrolyte 400. Therefore, liquid seal of the air cathode 301 is a significant consideration. It has been discovered that leaking of electrolyte 400 into cavity 302 can occur after an extended period of use of the air cathode 301 in the cell 100. Thus, in numerous observed cases the air cathode 301 was initially free from leakage in testing and leakage occurs after extended use. It has been observed that leakage tended to occur at places where the sealing was weak or defective between the oxygen membrane electrode and air cathode frame. Electrolyte was also found to leak through the membrane oxygen electrode. Investigations identified that the leakage through oxygen membrane electrode is due to defects (pinholes and large pores) across the surface of a membrane oxygen electrode, which may have resulted from its manufacturing process. The defects can permit liquid to leak through the membrane oxygen electrode and into the enclosed cavity 302. Presence of defects and weak spots in membrane oxygen electrodes cannot be fully prevented through quality control inspection, and therefore at present a small but significant percentage of oxygen membrane electrodes are expected to contain a defect or weak spot that can allow leakage after a relatively short time of operation. The size of defects such as pinholes, dents, and the like and degree of weakness of weak spots or areas can vary such that leakage tends to develop at different time interval of operation. The time when first leaking is noticeable in an air cathode varies with oxygen membrane electrode—some immediately after the air cathode is placed into the electrolyte, some only after weeks of discharging operation. The rate of leaking also varies, from slowly seeping through and forming a small droplet in several hours, to forming a droplet in seconds. It appears that many air cathodes eventually experiencing leaking. Thus, an effective solution needs to be developed in order for air cathodes to function continuously over time.

Solutions have been developed to address the potential for leakage into cavity 302.

Figure 2A:
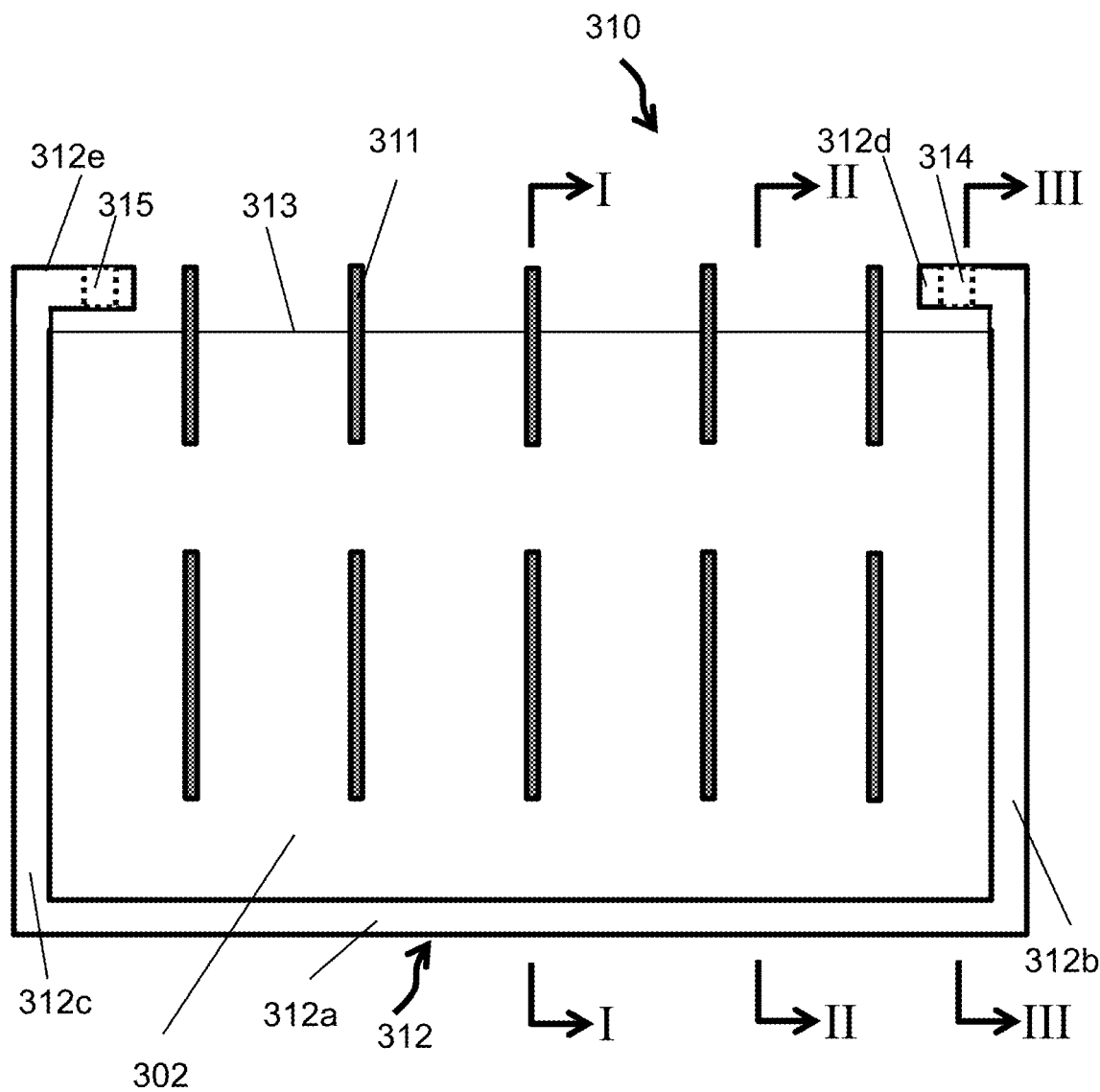
FIG. 2A shows a side view.
Figure 2B:
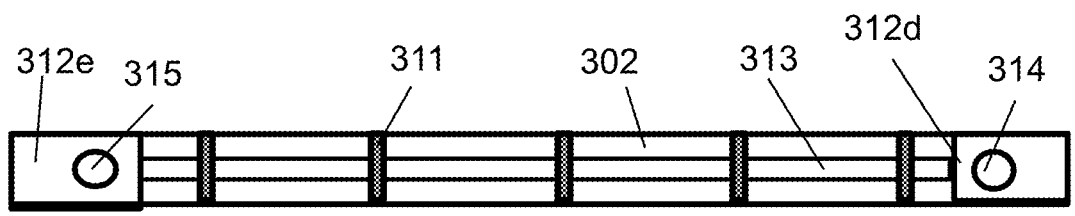
FIG. 2B shows a top view and FIG. 2C shows various cross-section views of an air cathode frame having a convex-shaped top surface.
Figure 2C:
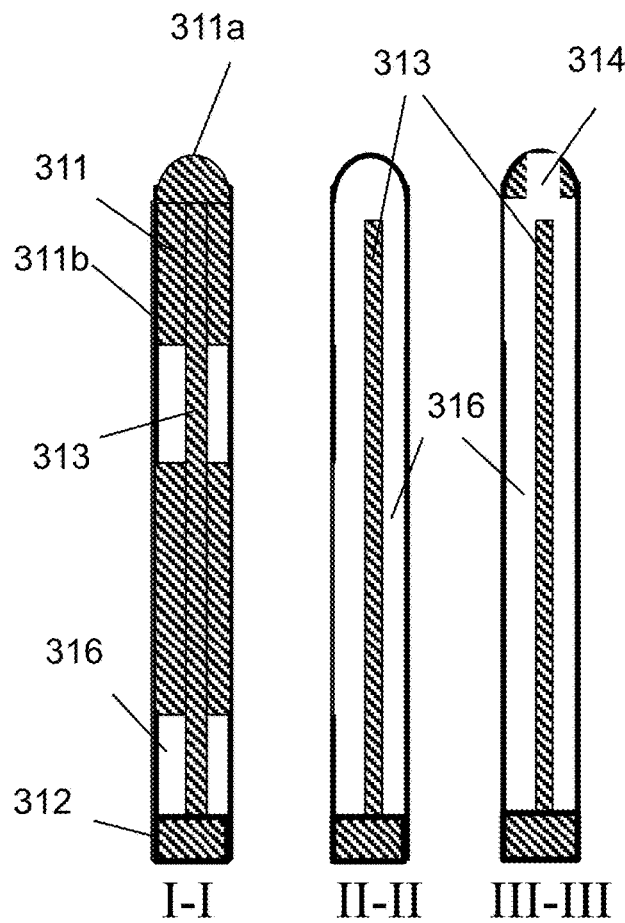
Figure 2D:
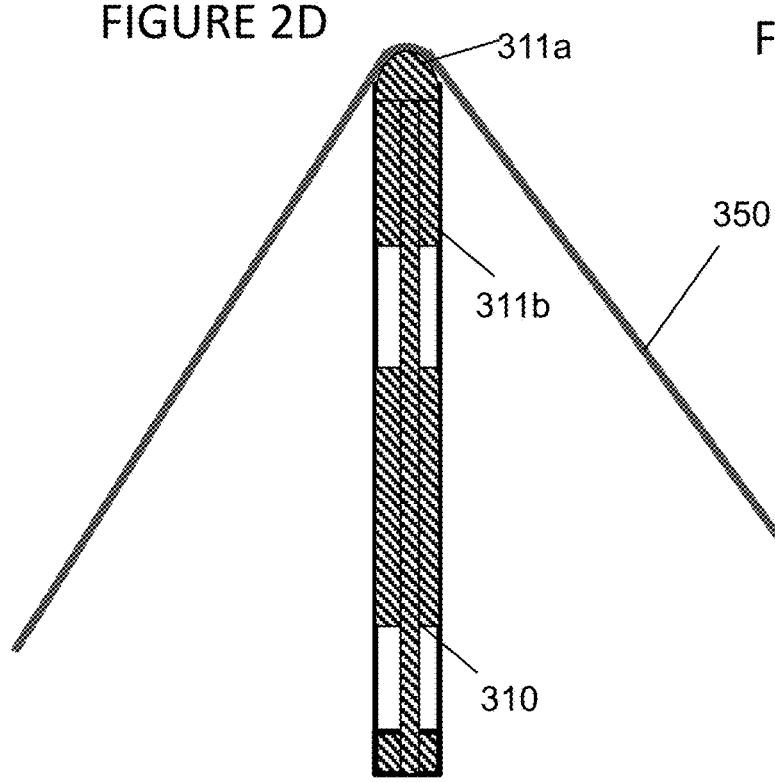
FIGS. 2D and 2E show the air cathode frame with attachment of a single membrane oxygen electrode (2D and 2E) and a separator (2E)
Figure 2E:
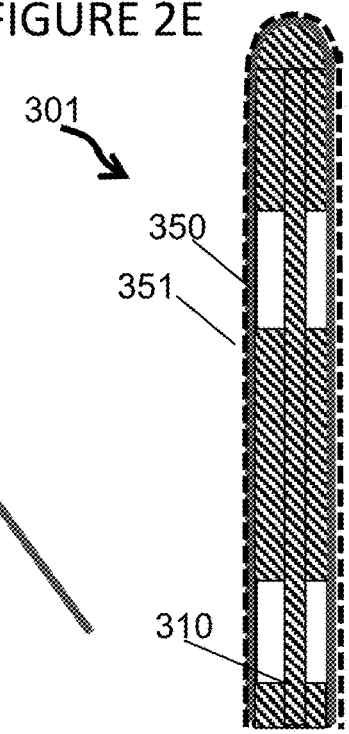

A first solution is shown in FIGS. 2A to 2E. Sealing edges between membrane oxygen electrodes and an air cathode frame are potential sources of leaks. When first and second membrane oxygen electrodes are attached to opposing side faces of a frame, each membrane oxygen electrode requires four sealing edges—two horizontal edges and two vertical edges. FIGS. 2D and 2E show a single membrane oxygen electrode 350 covering both opposing side faces of frame 310 as well as a top of the frame 310, thus reducing horizontal sealing edges by half as compared to the use of first and second membrane oxygen electrodes each attached to one of the side faces. In addition to reducing potential for leaks, the integral coverage of top and both side surfaces of the frame 310 achieved by the single membrane oxygen electrode 350 provides an advantage of increasing the electrically active surface area of the air cathode as compared to the use of first and second membrane oxygen electrode.

FIG. 2A shows a side view of air cathode frame 310, while FIG. 2B shows a top view of frame 310 and FIG. 2C shows various cross-sectional views (specifically views on cut-lines I-I, II-II, and III-III shown in FIG. 2A). Frame 310 is bound by a border 312, the border configured as a U-shape with a bottom arm 312a, and two substantially parallel and substantially co-extensive vertical arms 312b, 312c, and an inwardly oriented top overhang extending from the top end of each vertical arm 312d, 312e. Thus, opposing first and second top overhangs 312d, 312e extend co-axially inwardly toward each other from the top ends of first and second vertical arms 312b, 312c, respectively. An air inlet 314 is defined within the first top overhang 312d, and an air outlet 315 is defined within the second opposing top overhang 312e. Both the air inlet 314 and the air outlet 315 are formed as a tubular aperture within each top overhang, the tubular aperture configured to operably connect with tubing communicative with an air source, including for example an air pump (not shown). Each tubular aperture extends through the top overhangs 312d, 312e, providing fluid (ie., gaseous) communication between an exterior of the air cathode and an interior cavity 302 defined by frame 310.

A base plate 313 can be attached continuously to interior surfaces of bottom arm 312a, and vertical arms 312b,c of border 312 as shown in FIG. 2A, or can connect intermittently to one or more arms of the border 312 as desired. The base plate 313 may be non-porous as shown in FIG. 2A, or may be perforated in any desired pattern. The base plate 313 segments the interior cavity 302 defined by border 312. The base plate 313 functions to support a plurality of ridges 311 that extend from base plate 313. The plurality of ridges 311 are substantially co-planar with border 312, so that the border 312 provides a sealing surface to attach to sealing edges of the single membrane oxygen electrode 350, while curved top edges 311a and lateral edges 311b of the plurality of ridges 311 combine to form an abutting support for the interior surface of the single membrane oxygen electrode 350, to reinforce and maintain a position and shape of the single membrane oxygen electrode throughout operation.

FIGS. 2D and 2E show cross-section view I-I to illustrate attachment of the single membrane oxygen electrode 350 to frame 310, with the single membrane oxygen electrode 350 receiving abutting support from the curved top edges 311a and lateral edges 311b of the plurality of ridges 311. Curved top edges 311a align with curved top surfaces of opposing first and second co-axial top overhangs 312d, 312e, and thereby co-operatively support an inverted U-shaped or convex-shaped top bend of the single membrane oxygen electrode 350 in continuous sealed attachment with a first side of the frame, a top of the frame and a second side of the frame.

FIG. 2E additionally shows attachment of separator 351 to cover the single membrane oxygen electrode 350, and prevent direct contact with discharging anodes 500 formed in first spaces 101 by dislodged/fallen metal deposit 501. The separator 351 is a liquid permeable membrane that functions to maintain a sufficient physical distance between anode and cathode surfaces to prevent electrical short circuits, while also allowing the transport of water and ionic charge carriers that are needed to close the circuit during the passage of current in an electrochemical cell. The separator is electrochemically stable with respect to electrolyte, and both anode and cathode surfaces, and is of sufficient mechanical strength to withstand tensioned attachment to the air cathode.

Membrane oxygen electrodes and separators are well known in the field of electrochemical power sources, and compatible combinations of membrane oxygen electrodes and separators may be selected as desired to suit a specific implementation. Examples of membrane oxygen electrodes are described in D. Linden, Handbook of Batteries, 3rd edition, McGraw-Hill, New York, 2002. Examples of separators are described in Rahman et al. (2013) "The Electrochemical Society High Energy Density Metal-Air Batteries: A Review" J. Electrochem. Soc., Vol. 160 (10): A1759-A1771.

The frame 310 can be manufactured as a single integral component, or may be manufactured as separate border 312, base plate 313 and ridge 311 components that are connected in a desired configuration.

Figure 3:
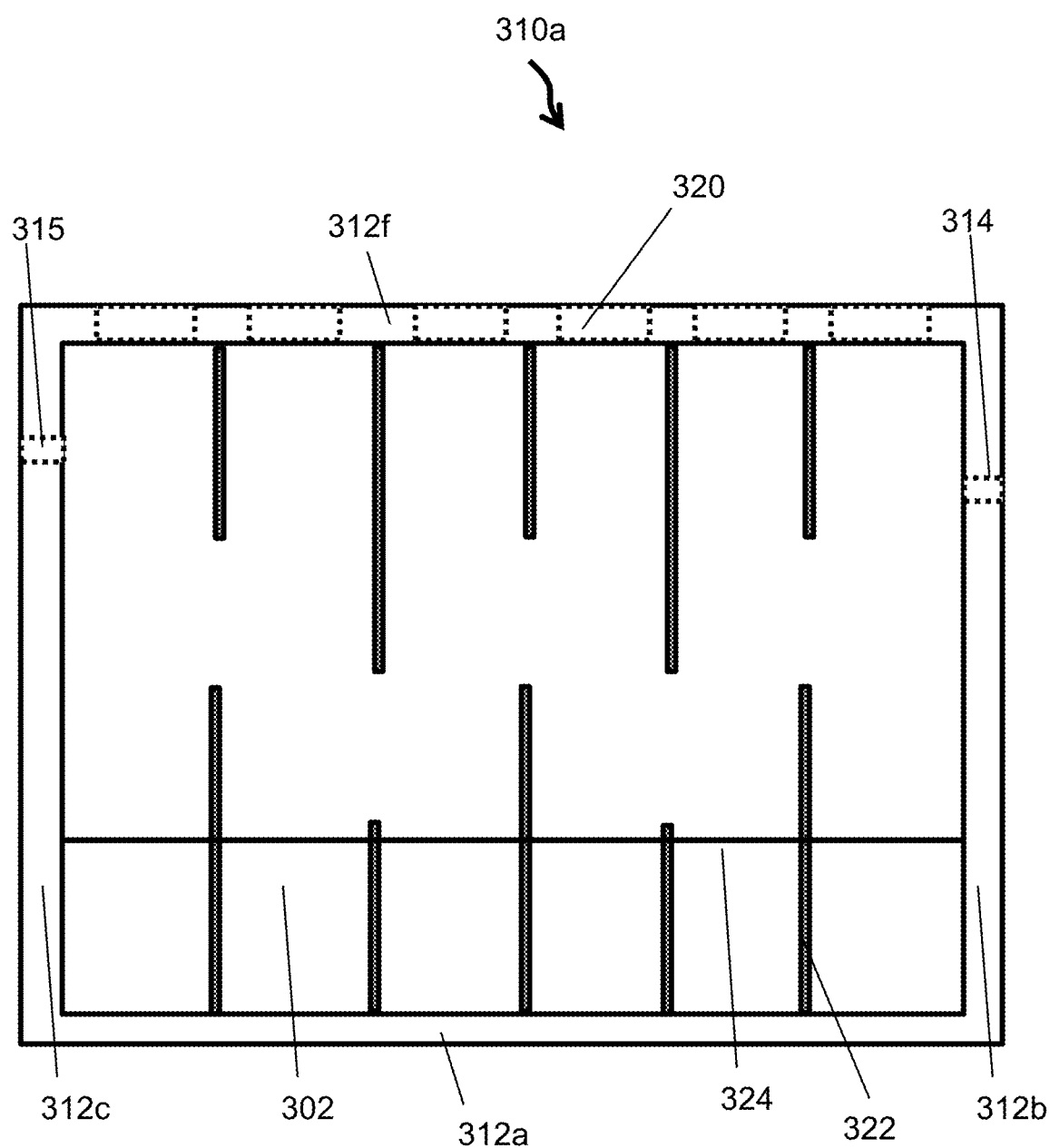
FIG. 3 shows a side view of a variant air cathode frame having a convex-shaped top surface.

While FIGS. 2A-2E show a specific variant of the frame 310 for illustrative purposes, it should be recognized that many other variants can be readily implemented, and each variant may have many shapes and configurations. For example, as shown in FIG. 3, a continuous border variant of border 312 may be sufficient to form frame 310a, without a need for a base plate 313 and ridges 311—a continuous border variant can be formed as a rectangular shape with opposing top 312f and bottom 312a arms and opposing vertical side arms 312b, 312c, an air inlet 314 formed in one of the arms, an air outlet 315 formed in one of the arms and the top arm 312f having a semi-cylindrical convex top surface with windows 320 or vent gratings optionally formed in the top arm to allow portions of the interior surface of the membrane oxygen electrode abutting the semi-cylindrical convex top surface to be exposed to air circulated within the enclosed cavity 302.

As the semi-cylindrical convex top surface of the top arm 312f of the continuous border variant replaces the rounded support surface of the combined co-aligned plurality of curved top edges 311a of ridges 311, a base plate 313 and ridges 311 become optional. Many different variations of the frame 310 are feasible provided that a rounded or curved support is provided at the top edge of frame 310 to provide abutting support for a single membrane oxygen electrode 350 covering both opposing side faces of frame 310 as well as a top of the frame 310. The rounded or curved top surface shape of frame 310 supports an inverted U-shaped or convex-shaped bend of the single membrane oxygen electrode 350 reducing mechanical strain on both the membrane itself and its attachment to the frame compared to a flat top surface shape of the frame.

Frame 310a can include additional abutting support to reinforce and maintain position of the membrane oxygen electrode provided by one or more primary support bars 322 extending from an interior surface of the boarder 312, such as one or more horizontal, vertical or diagonal bars extending from one arm towards or to another arm. Furthermore, one or more secondary support bars 324 may be optionally included to fortify or reinforce the one or more primary support bars 322. Primary support bars 322 function to provide abutting support for the membrane oxygen electrode, and therefore will often be sized and positioned to provide first and second opposing surfaces that abut a membrane oxygen electrode in alignment with corresponding first and second opposing surfaces of one or more of the arms of frame 310a. A distance between first and second opposing surfaces of the arm of frame 310a for contacting a membrane oxygen electrode will typically be substantially equal to the distance between opposing surfaces of a membrane oxygen electrode across the interior cavity 302 at a plane of contact with the arm. Similarly, a distance between first and second opposing surfaces of the primary support bar 322 for contacting a membrane oxygen electrode will typically be substantially equal to the distance between opposing surfaces of a membrane oxygen electrode across the interior cavity 302 at the plane of contact with the primary support bar. Primary support bars 322 may be oriented to direct air flow, and may be perforated as desired to further modify air flow. Secondary support bars 324 function to fortify or reinforce primary support bars 322 and therefore may not provide any surface for abutting a membrane oxygen electrode. A secondary support bar 324 will typically be a rod have a diameter size that is less than 80% of the distance between opposing surfaces of a membrane oxygen electrode across the interior cavity 302. Still further variants of frame 310 are contemplated.

Another solution to address the potential for leakage into cavity 302 is illustrated in FIGS. 4 to 8.

Figure 4:
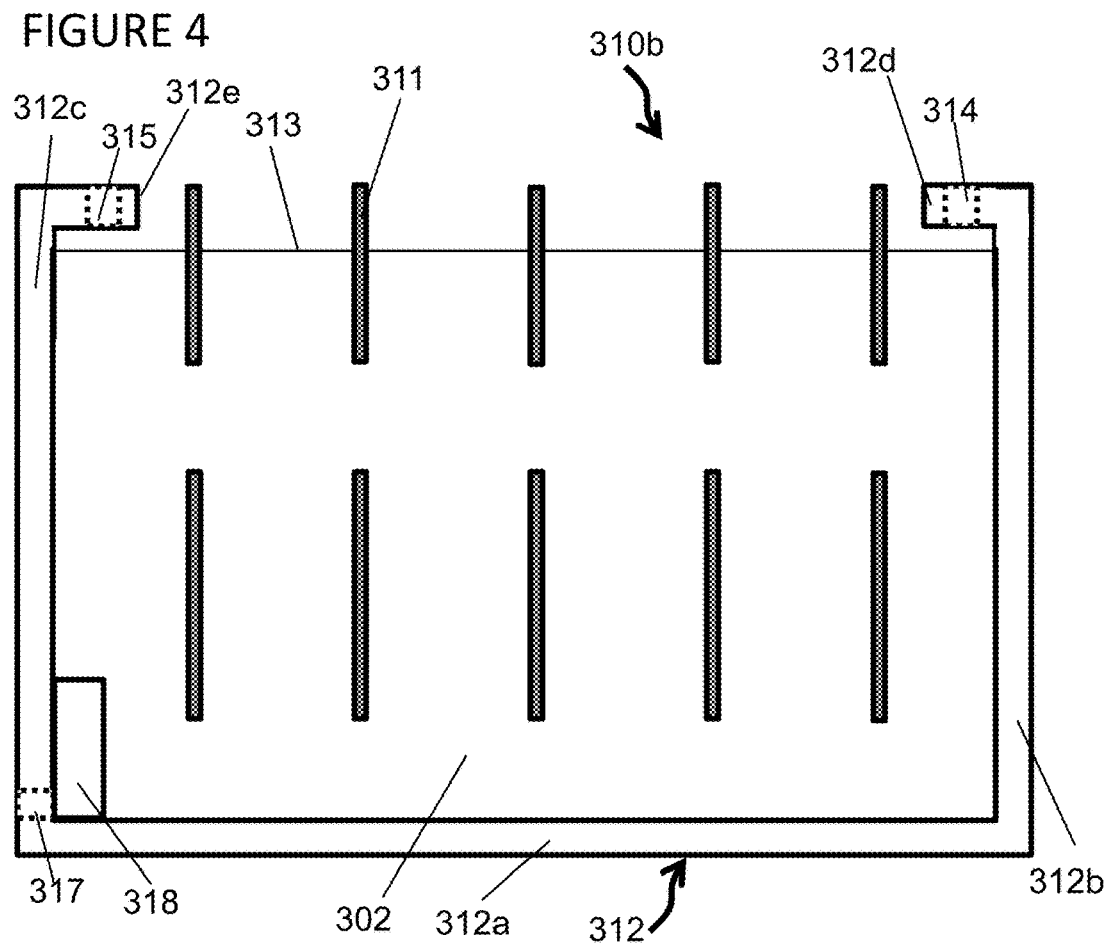
FIG. 4 shows a side view of an air cathode frame including a liquid outlet.

FIG. 4 shows a side view of air cathode frame 310b, a variant of frame 310 shown in FIG. 2A. Frame 310b is the same as frame 310 in being bound by a border 312, the border 312 configured as a U-shape with a bottom arm 312a, and two substantially parallel and substantially co-extensive vertical arms 312b, 312c, an inwardly oriented top overhang 312d, 312e extending from the top end of each vertical arm 312b, 312c, an air inlet 314 defined within the first top overhang 312d, an air outlet 315 is defined within the second opposing top overhang 312e, a base plate 313 attached to an interior surface of border 312, and a plurality of ridges 311 extending from base plate 313.

Frame 310b differs from frame 310 in that it further includes a liquid outlet 317 defined at or near a bottom end of vertical arm 312c. A further difference is a clearance 318 formed as an opening in a portion of base plate 313 located at or near the bottom end of vertical arm 312c, clearance 318 operably communicative with liquid outlet 317. The function of clearance 318 is to reduce obstruction of flow by base plate 313 on liquid outlet 317.

The air inlet 314, the air outlet 315 and the liquid outlet 317 may all be formed as tubular apertures through border 312 supporting flow between interior and exterior surfaces of border 312. The tubular aperture defining each outlet can be configured to operably connect with auxiliary components to control and/or collect flow, for example, tubing communicative with an air source, for example an air pump (not shown) for air inlet 314 or air outlet 315, and for example, tubing communicative with a reservoir and a pump (not shown) for liquid outlet 317. Each of air inlet 314, air outlet 315, and liquid outlet 317 is a tubular aperture that extends through border 312, providing fluid communication between any tubing operably connected to each outlet and the interior cavity 302 defined by frame 310a and its sealed enclosure by membrane oxygen electrode 350.

Figure 5:
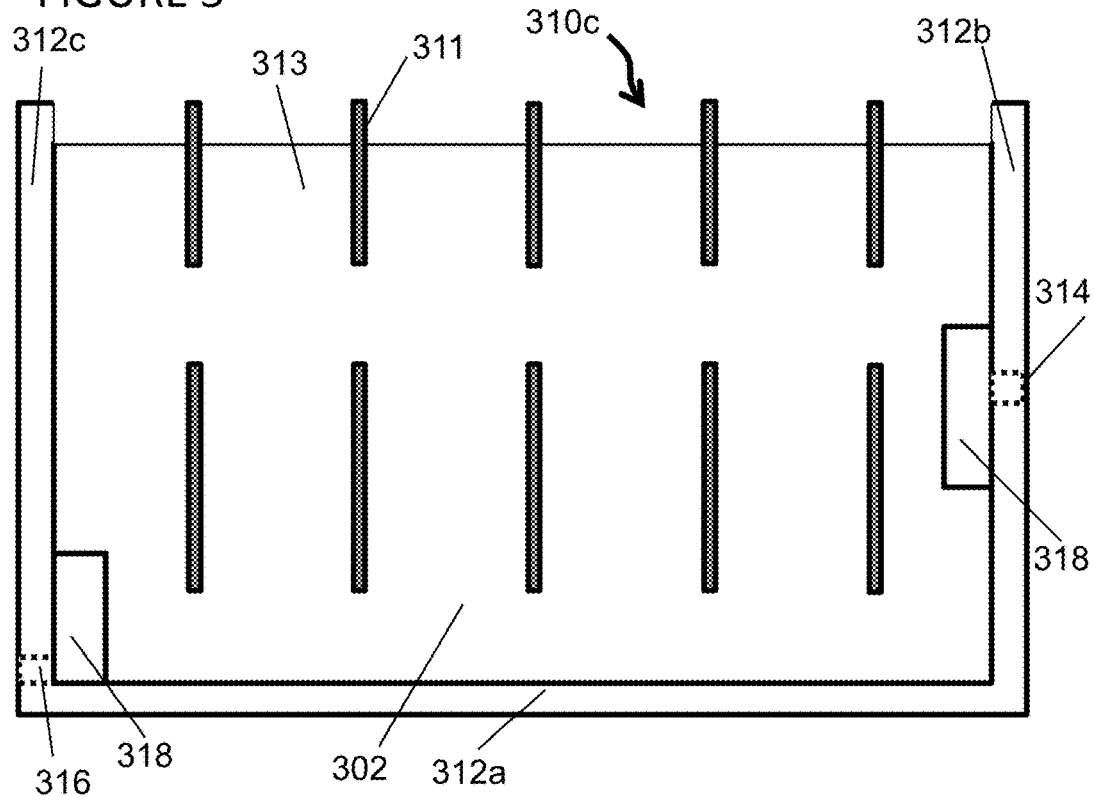
FIG. 5 shows a side view of a variant air cathode frame including a liquid outlet.

Air inlet 314, air outlet 315 and liquid outlet 317 can be positioned in many different configurations on frame 310 and its variants, provided that liquid outlet 317 is positioned at the same height or lower than the air inlet 314 and the air outlet 315; the distance between the liquid outlet 317 and bottom frame arm 312a is less than or equal to the distance between the air inlet 314 and bottom frame arm 312a, as well as less than or equal to the distance between the air outlet 315 and bottom fame arm 312a. For example, FIG. 5 shows a variant frame 310c including a border configured as a U-shape with a bottom arm 312a, and two substantially parallel and substantially co-extensive vertical arms 312b, 312c, but without the inwardly oriented top overhangs 312d, 312e extending from the top end of each vertical arm. Variant frame 310c further includes air outlet 314 defined at a central portion of vertical arm 312b operably communicative with clearance 318 formed as an opening in a corresponding portion of base plate 313, and a combined air outlet and liquid outlet 316 defined at a bottom portion of vertical arm 312c operably communicative with clearance 318 formed as an opening in a corresponding portion of base plate 313.

FIGS. 6A-6D show further examples of different configurations of air inlet, air outlet, and liquid outlet, all of which maintain a distance between the liquid outlet and the bottom arm of the frame that is less than or equal to corresponding distances for the air inlet or the air outlet.

Figure 6A:
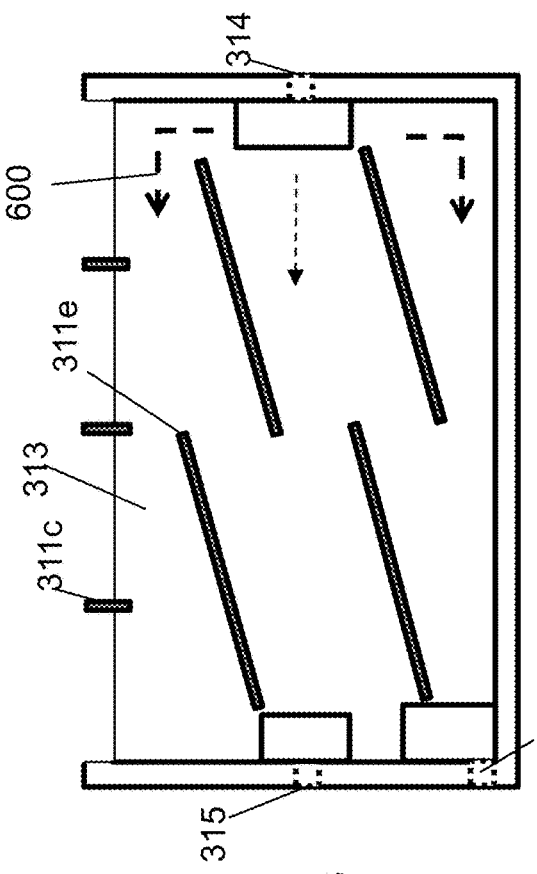
FIGS. 6A, 6B, 6C, and 6D each show a side view of further variants of an air cathode frame including a liquid outlet.
Figure 6B:
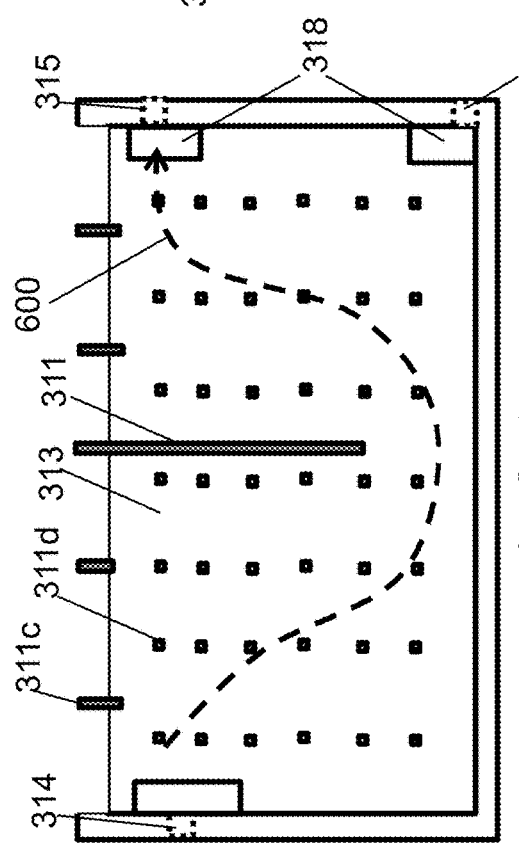
Figure 6C:
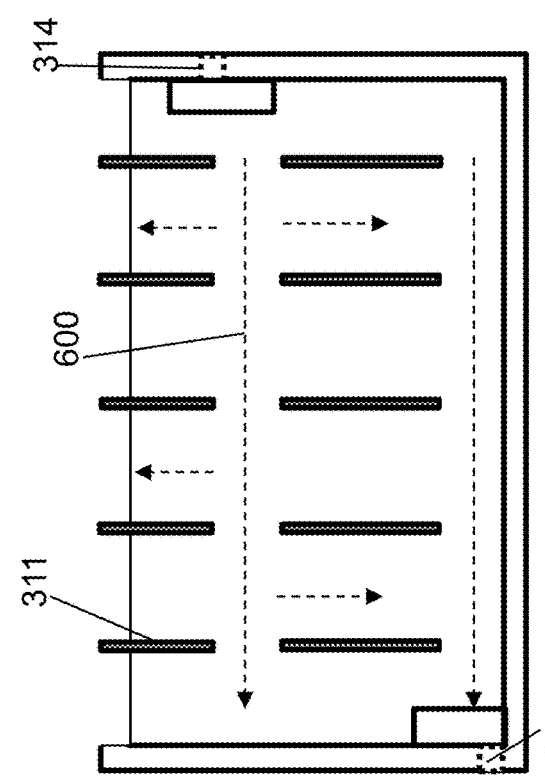
Figure 6D:
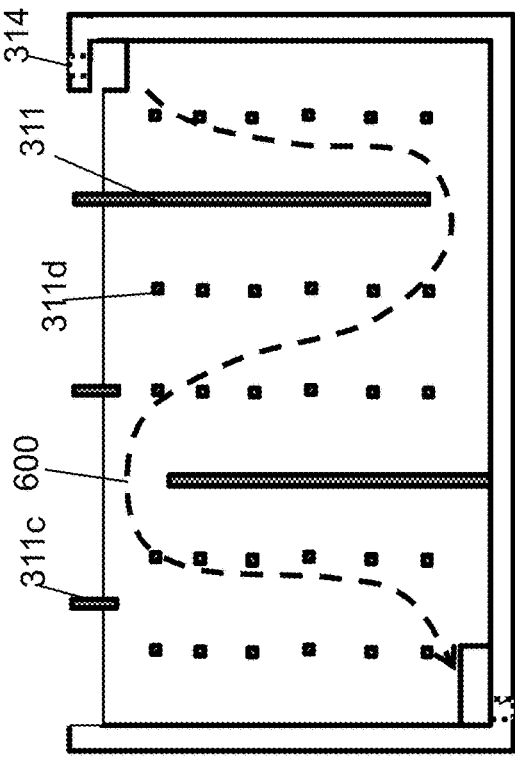

FIGS. 6A-6D also show examples of modification of ridge patterns to direct an air flow path 600 and achieve a desired air circulation through interior cavity 302 during operation. FIG. 6A shows a combination of surface features extending from base plate 313, including a plurality of curved or rounded ridges 311c (devoid of lateral edges 311b shown in FIGS. 2C and 2D) extending from a top edge of the base plate 313, a ridge 311 having both curved edges 311a and lateral edges 311b, and a plurality of posts 311d arranged in a grid pattern of 7 columns and 6 rows. FIG. 6B shows a combination of curved or rounded ridges 311c extending from a top edge of base plate 313 and diagonally oriented ridges 311e extending from an interior portion of base plate 313. Diagonally oriented ridges 311e are inclined/declined from horizontal to facilitate or direct electrolyte drainage towards the liquid outlet 317. FIGS. 6C and 6D shows further configurations of ridges 311, 311c and/or 311d positioned in relation to air inlet and outlet to promote a corresponding air flow path 600, and more generally, air circulation during operation.

Figure 7:
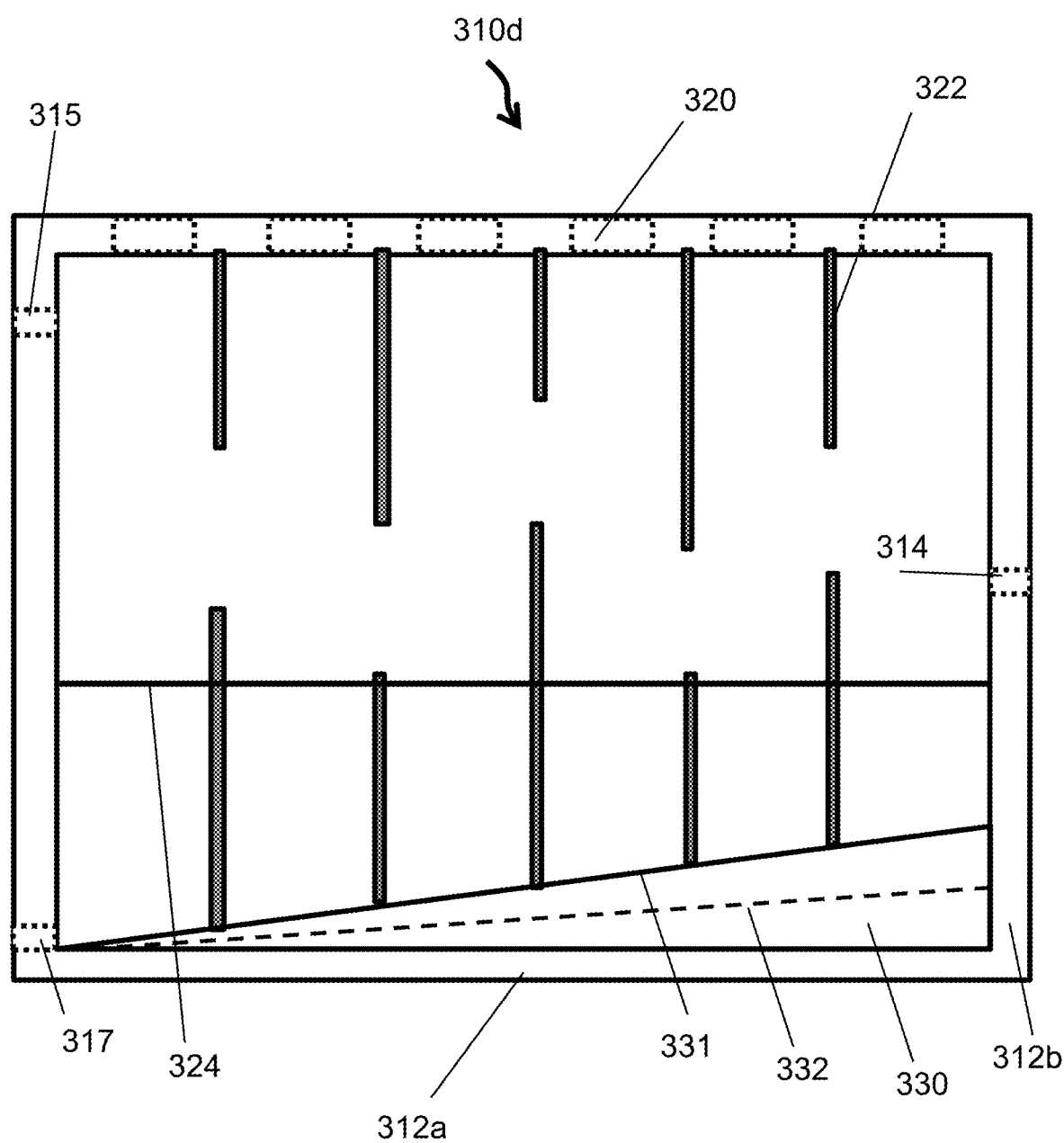
FIG. 7 shows a side view of another variant air cathode frame including a liquid outlet.

FIG. 7 shows a further example of a frame including air inlet 314, air outlet 315, and liquid outlet 317. Variant frame 310d is similar to variant frame 310a shown in FIG. 4 in being devoid of a base plate 313 and connected ridges 311, differing in that variant frame 310d includes a diagonal gutter 330 to direct electrolyte drainage towards liquid outlet 317. The diagonal gutter 330 is formed along an interior surface of bottom arm 312a of border 312, the gutter 330 including a crest surface 331 and a co-extensive trough 332, the trough having an inclined/declined orientation with the declined (lower) end of the trough aligned with the liquid outlet 317 for fluid communication between the gutter 330 and liquid outlet 317. The inclined (upper) end of the trough 332 abuts an interior surface of vertical arm 312b of border 312, and the trough 332 continuously declines from vertical arm 312b to liquid outlet 317. Primary support bars 322 can extend from the crest surface 331 within the interior cavity 302 and the primary support bars 322 may be fortified or reinforced by a transverse secondary support bar 324. The gutter 330 may be formed with any desired crest/trough structure. For example, in lateral cross-section the gutter 330 may be U-shaped or concave-shaped with two opposing crest surface and a central trough or the gutter may be wedge shaped with a single crest surface declining to a trough that is sized to abut the membrane oxygen electrode so that the electrode forms a wall of the gutter.

FIG. 8A shows a side view and FIG. 8B shows a cross-section view along cut line IV-IV of another example of a variant frame supporting an air cathode that is placed along an interior surface of a side wall of cell container 110. In this variant frame, ridges 311 are formed without curved top edges 311a as the membrane oxygen electrode is attached to a single side and top of the variant frame. Therefore, the membrane oxygen electrode is attached in a linear rather than curvilinear profile, and more specifically does not make an inverted U-shaped or convex-shaped top bend as typically seen when a single membrane oxygen electrode continuously attaches to a first side of the frame, a top of the frame and a second side of the frame as shown for example in FIGS. 2A-2E. Instead the variant frame shown in FIGS. 8A and 8B comprises a sloped or tapered portion at the top of the variant frame. The sloped top portion allows a smooth bordering with the sides of the cell container and may help downward movement of the metallic materials along the sides of the cell container and down towards the first space located adjacent to the air cathode.

Figure 9A:
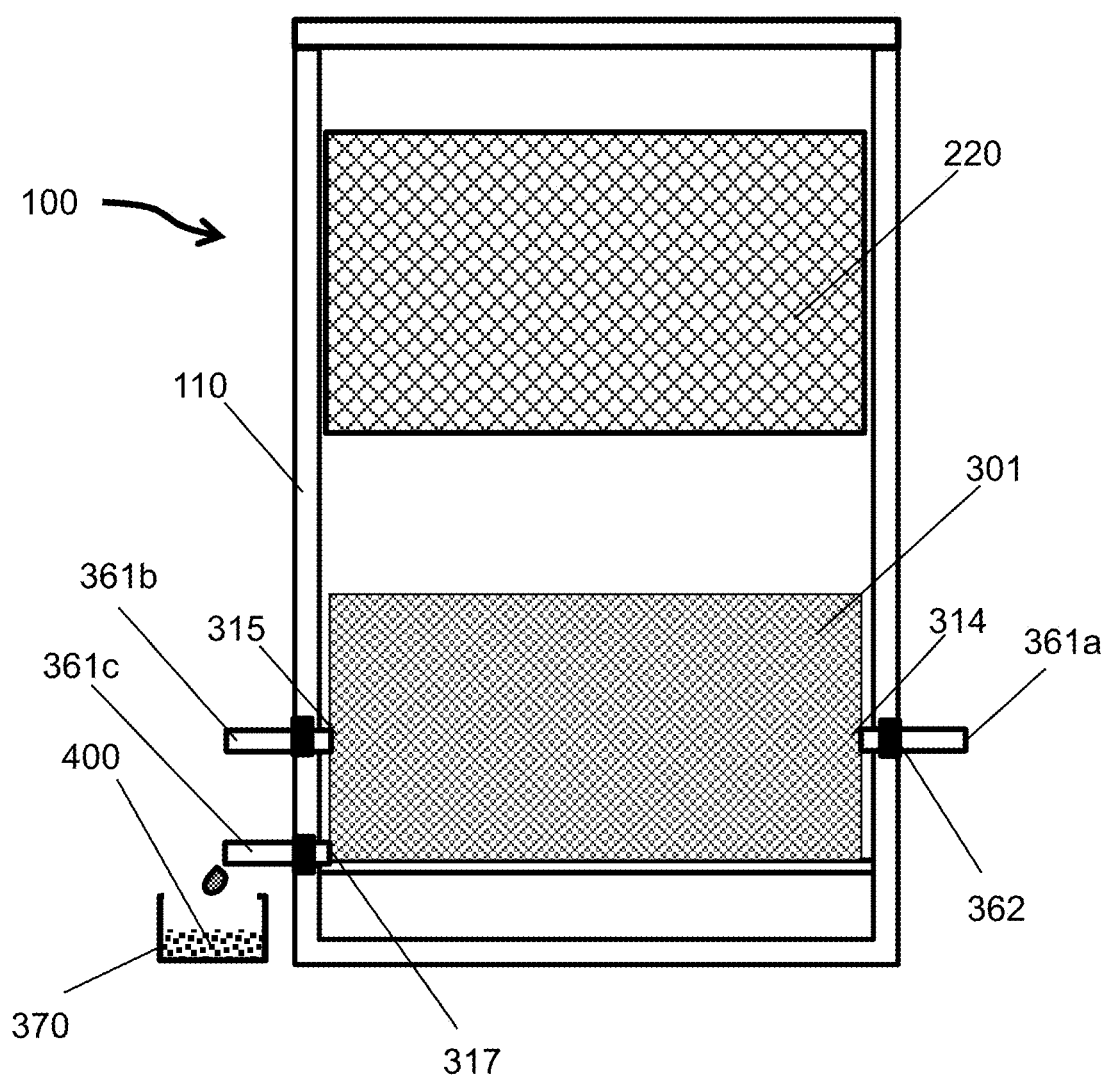
FIG. 9A shows a side view and FIG. 9B shows an end view of a plurality of air cathodes—each including a liquid outlet communicative with a reservoir—installed as a discharging assembly in an electrochemical cell system.
Figure 9B:
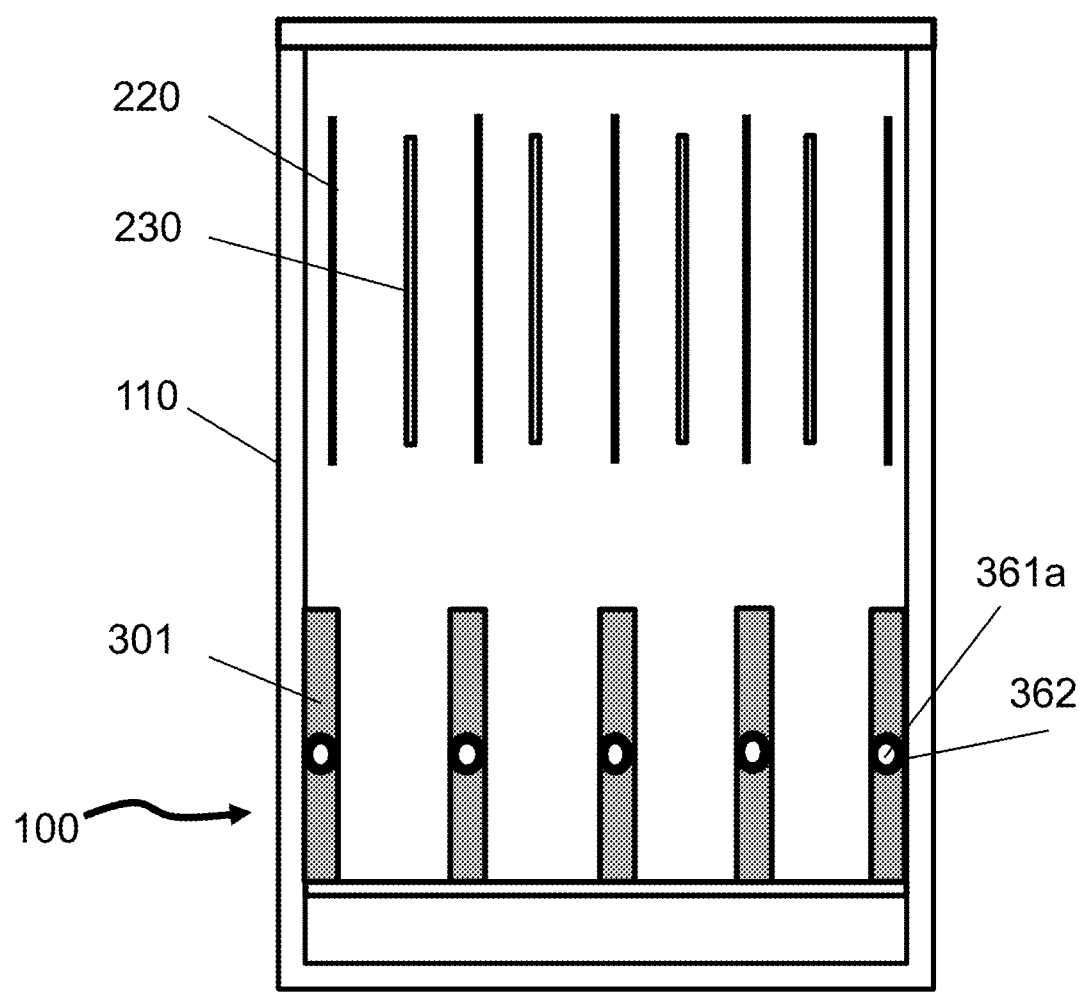
Figure 9C:
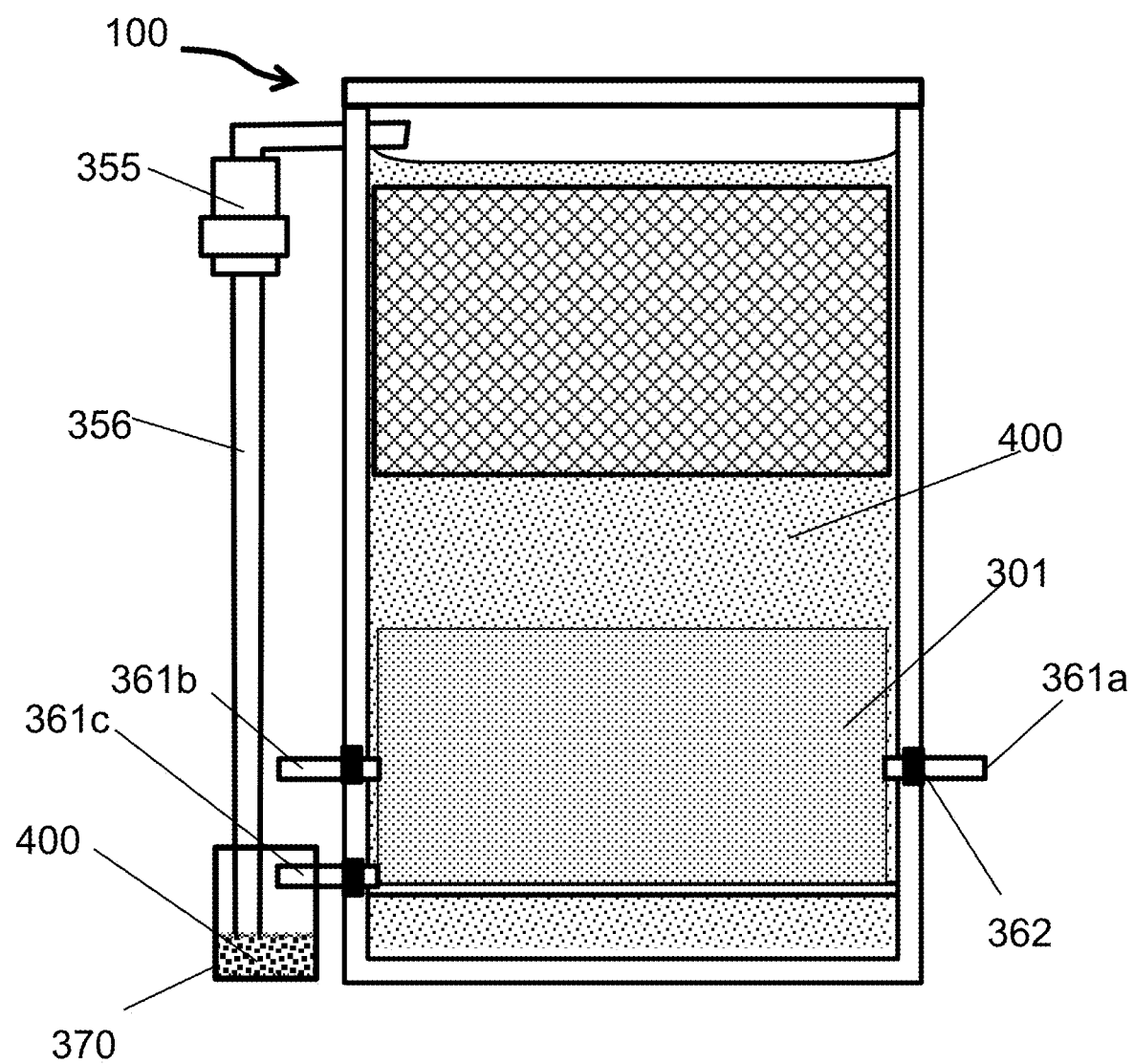
FIG. 9C shows the electrochemical cell system with a pump installed to return liquid from the reservoir to a container of the electrochemical cell system.

Whether air inlet, air outlet or liquid outlet are located at the top or side of frame 310 or any one of its variants, the shortest distance of communicative tubing to the exterior surface of container 110 is provided by passing the communicative tubing through a side wall of the container 110. FIGS. 9A and 9B show an example of communicative tubing passing through a side wall of the container 110. Tubing 361a connects with a port for air inlet 314, and tubing 361a passes through a bore formed in side wall of container 110, with a sealing gasket or a sealing ring 362 disposed within the bore that circumferentially seals tubing 361a to prevent electrolyte leakage through the bore, more particularly to prevent electrolyte leakage between the interior surface of the bore and the exterior surface of tubing 361a. Similarly, tubing 361b, as air outlet, connects with a port for air outlet 315, and tubing 361b passes through a bore formed in side wall of container 110, with a sealing gasket or sealing ring 362 disposed within the bore to circumferentially seal tubing 361b to prevent electrolyte leakage through the bore, more particularly to prevent leakage between the interior surface of the bore and the exterior surface of tubing 361b. Similarly, tubing 361c connects with a port for liquid outlet 317, and tubing 361c passes through a bore formed in side wall of container 110, with a sealing gasket or a sealing ring 362 disposed within the bore to circumferentially seal tubing 361c to prevent electrolyte leakage through the bore, more particularly to prevent leakage between the interior surface of the bore and the exterior surface of tubing 361c. Tubing 361c provides a defined flow path to a reservoir 370 designated to collect electrolyte 400 drained from within interior cavity 302 of air cathode 301. Reservoir 370 can be operably connected with further tubing 356 and a pump 355 as desired to actively flow electrolyte from reservoir 370 into container 110, as shown for example in FIG. 9C. Alternatively, tubing 361c may be connected with a pump and tubing to provide a defined flow path into container 110 so that drained electrolyte 400 may directly flow from liquid outlet 317 through connected tubing back into container 110 without use of an intermediate storage container such as reservoir 370. In FIGS. 9A and 9C, drained electrolyte 400 collected in reservoir 370 is shown with a different visual pattern than the bulk body of electrolyte 400 inside container 110 for illustrative purposes only to better visually distinguish the structures of the reservoir 370 and the container 110, and it will be understood that the components of the drained electrolyte and the bulk body of electrolyte remain the same and therefore both are designated by reference numeral 400.

Figure 9D:
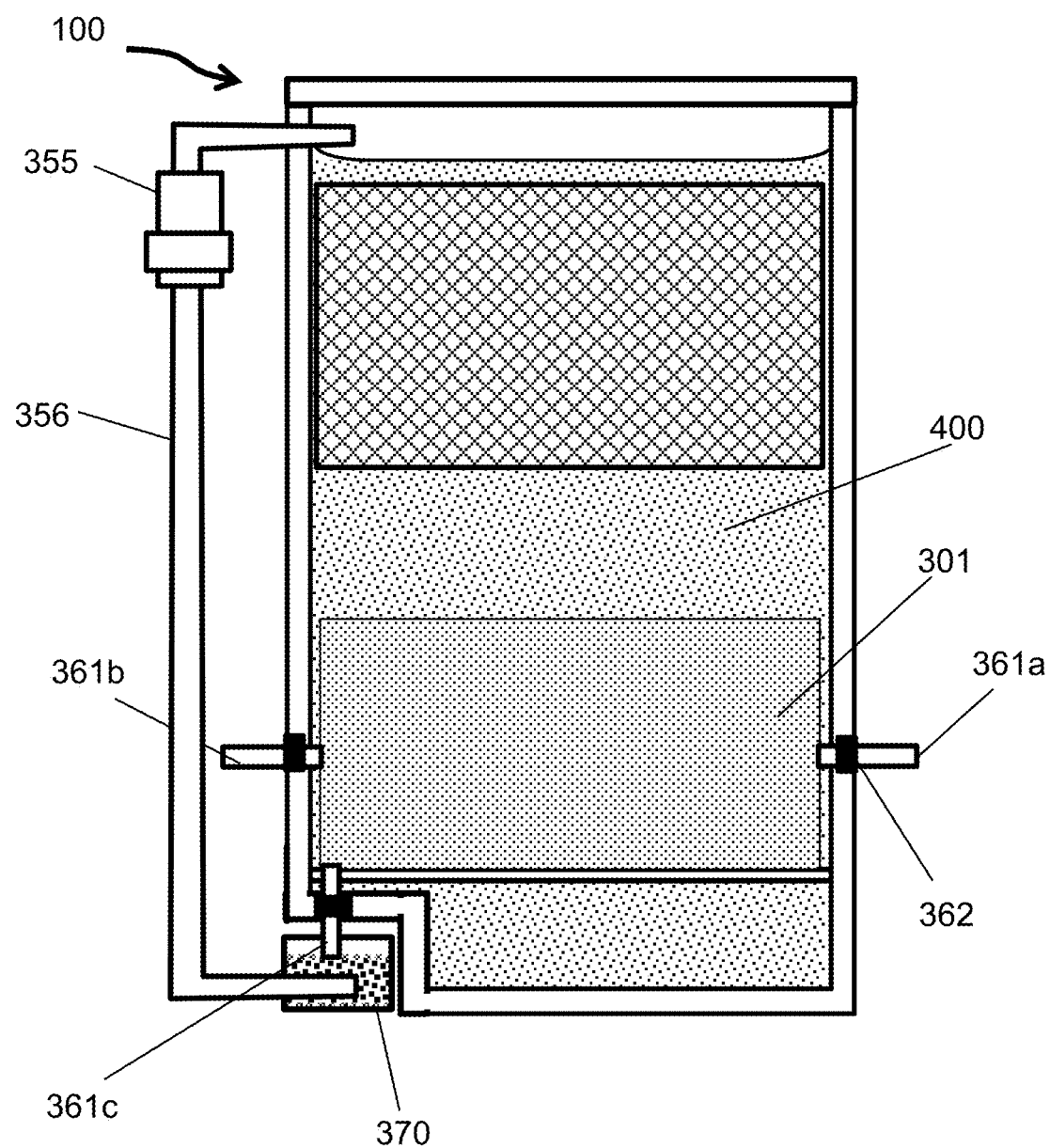
FIG. 9D shows a variant configuration of the electrochemical cell system shown in FIG. 9C.

The location of reservoir 370 may be varied. For example, FIG. 9D shows reservoir 370 placed outside and underneath container 110.

Figure 9E:
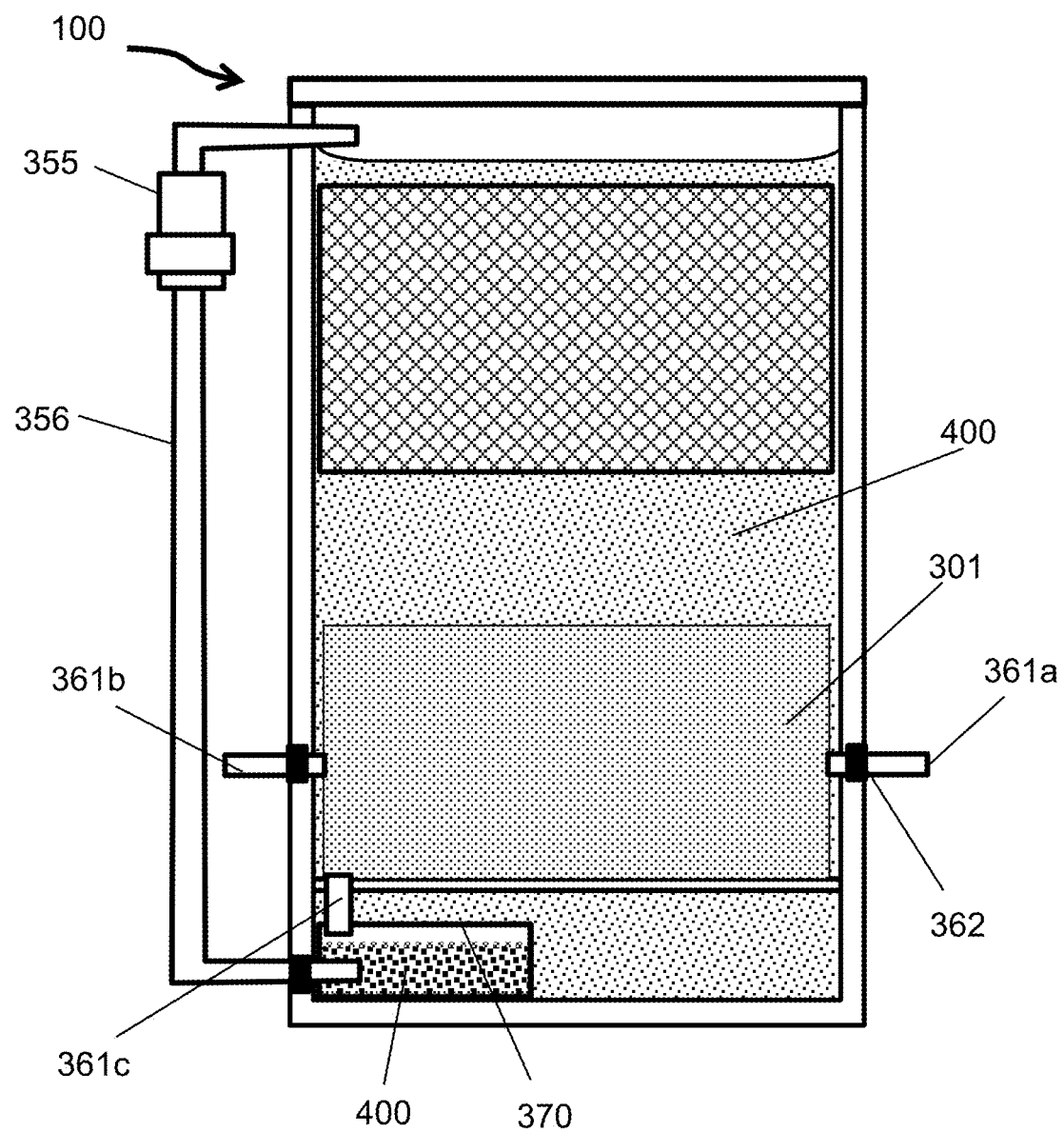
FIG. 9E shows another variant configuration of the electrochemical cell system shown in FIG. 9C.

FIG. 9E further shows an embodiment where reservoir 370 is placed inside the container 110 and tubing 361c is also placed inside container 110 connecting interior cavity 302 and the interior of reservoir 370. In this embodiment, tubing 356 passes through a bore formed in side wall of container 110, with a sealing gasket or ring 362 disposed within the bore to circumferentially seal tubing 356 to prevent electrolyte leakage through the bore, more particularly to prevent leakage between the interior surface of the bore and the exterior surface of tubing 356.

Figure 9F:
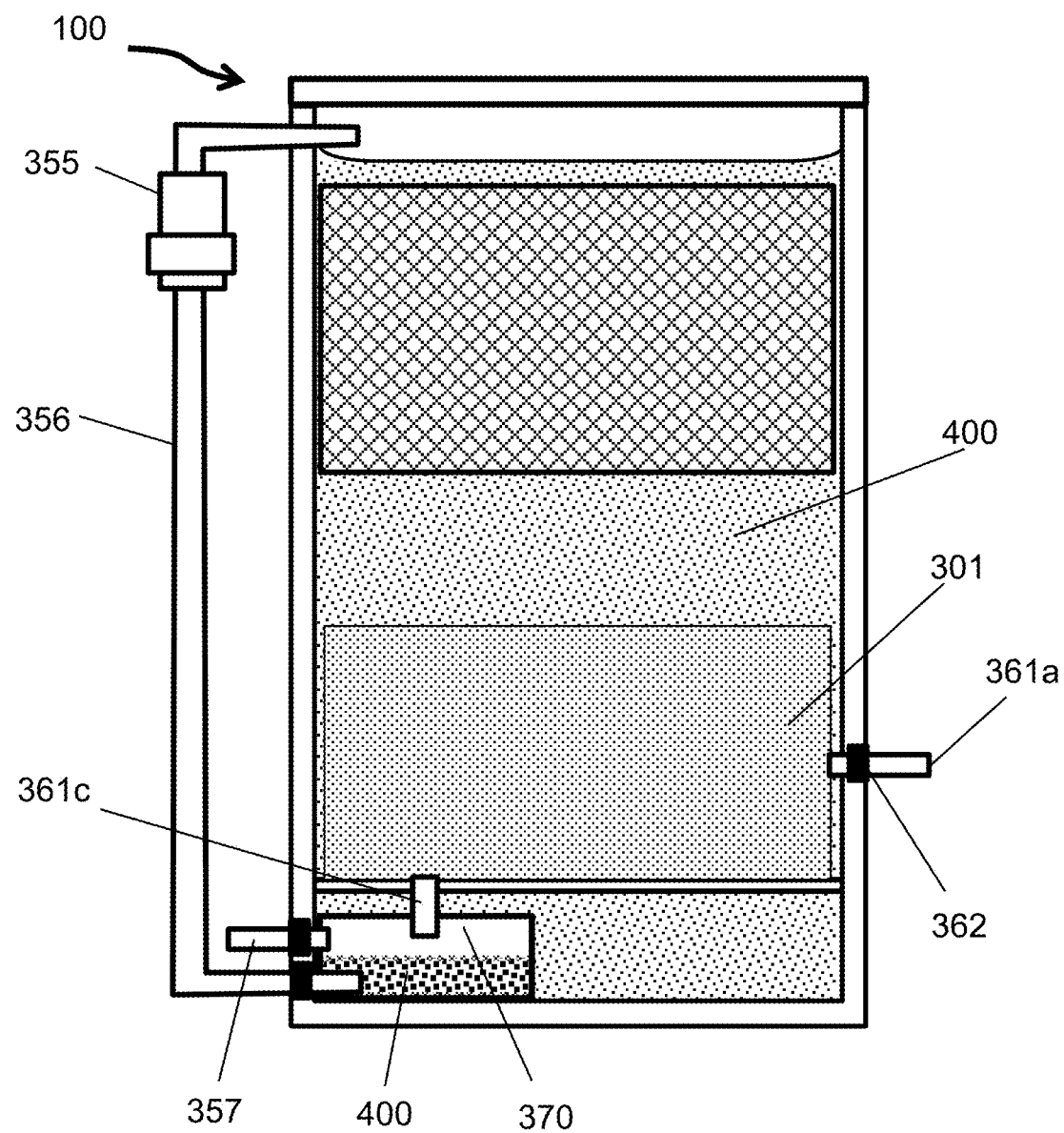
FIG. 9F shows another variant configuration of the electrochemical cell system shown in FIG. 9C.

FIG. 9F further illustrates a further embodiment where reservoir 370 is placed inside the container 110 and tubing 361c is also placed inside container 110 connecting interior cavity 302 and the interior of reservoir 370. In this embodiment, tubing 356 passes through a bore formed in side wall of container 110, with a sealing gasket or ring 362 disposed within the bore to circumferentially seal tubing 356 to prevent electrolyte leakage through the bore, more particularly to prevent leakage between the interior surface of the bore and the exterior surface of tubing 356. A tubing 357 connects the environment outside of the container 110 and the interior reservoir 370 and passes through a bore formed in side wall of container 110, with a sealing gasket 362 disposed within the bore to circumferentially seal tubing 357 to prevent electrolyte leakage through the bore, more particularly to prevent leakage between the interior surface of the bore and the exterior surface of tubing 357. In this example, tubing 361c functions as both an air outlet and liquid outlet with the air entered in cavity 302 passing through 361c into the interior of reservoir 370 and then passing through tube 357 to the exterior of container 110.

Figure 10:
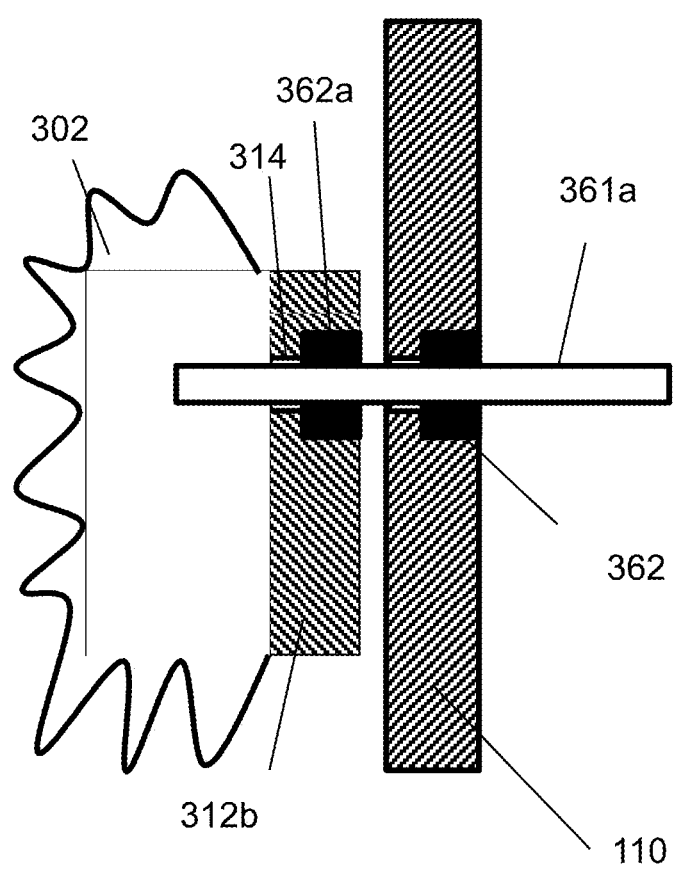
FIG. 10 shows a cross-section view of a sealing mechanism for passing tubing through a side wall of a container of an electrochemical cell system.

FIG. 10 shows a more detailed sectioned view of the sealing mechanism for passing tubing through a side wall of container 110. Tubing 361a connects with a port for air inlet 314 providing communicative air flow from an air pump (not shown) to the interior cavity 302 enclosed within air cathode 301. Extending from within internal cavity 302 to the exterior of container 110, the tubing 361a first passes through a port for air inlet 314, with a sealing gasket 362a disposed within the port to circumferentially seal tubing 361a to prevent electrolyte leakage through the air inlet port into the interior cavity 302. Tubing 361a then passes through a bore formed in side wall of container 110, with a sealing gasket 362 disposed within the bore to circumferentially seal tubing 361a to prevent electrolyte leakage through the bore to the exterior of the container 110.

FIG. 9B shows five air cathodes arranged in parallel with each air cathode connected to tubing extending outward through a bore in the side wall of container 110, each bore equipped with a sealing gasket, resulting in a total of five bores for air inlets and five bores for air outlets. The number of bores through the side walls of container 110 can be reduced by collecting tubing within the container 110 in a manifold and having a single tube extending from each manifold through a bore in the side wall of the container 110. For example, as shown in FIGS. 11A and 11B tubing communicative with air inlets of five air cathodes 301 can each operably connect with manifold 700a which is equipped with a single tube to extend through a bore in a side wall of container 110 to connect with an air pump as desired (not shown). Similarly, tubing communicative with air outlets of five air cathodes 301 can each operably connect with manifold 700b which is equipped with a single tube to extend through a bore in a side wall of container 110 to connect with an air pump as desired (not shown). Similar, manifold arrangement can be configured for liquid outlets.

Figure 12:
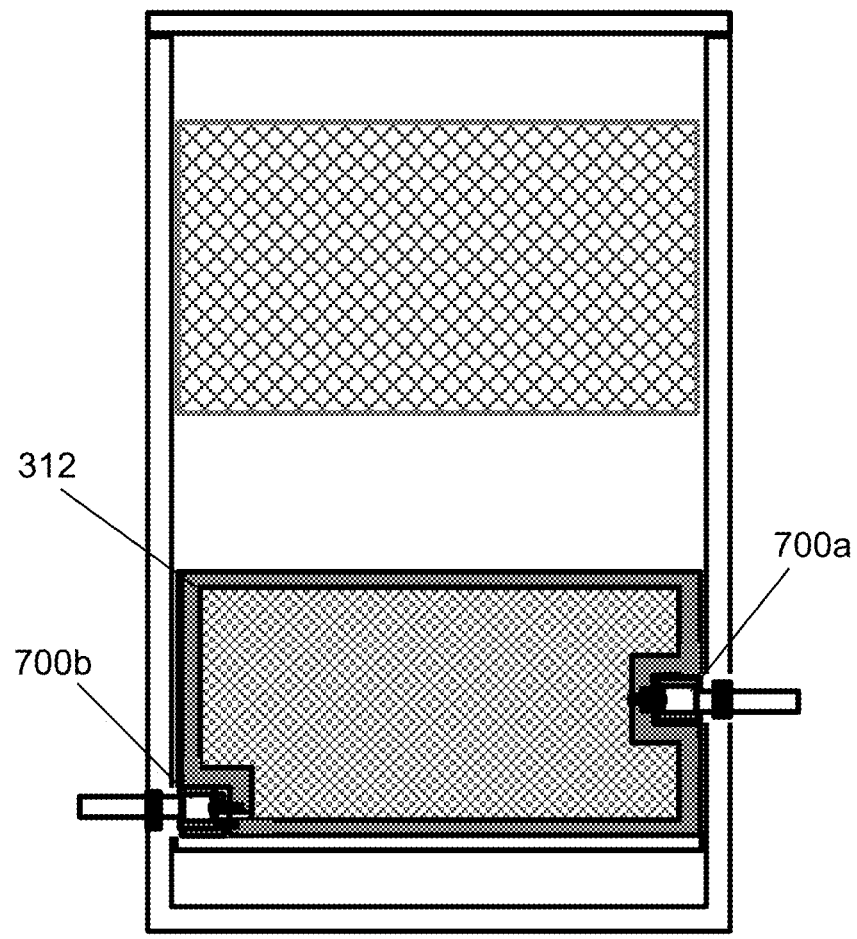
FIG. 12 shows a side view of a variant configuration of the manifold and air cathode arrangement shown in FIG. 11B.

FIG. 12 shows that border 312 of air cathode 301 may be shaped as desired with indents or pockets to accommodate manifolds 700a, 700b so as to maximize air cathode size and corresponding membrane oxygen electrode surface area.

Figure 13:
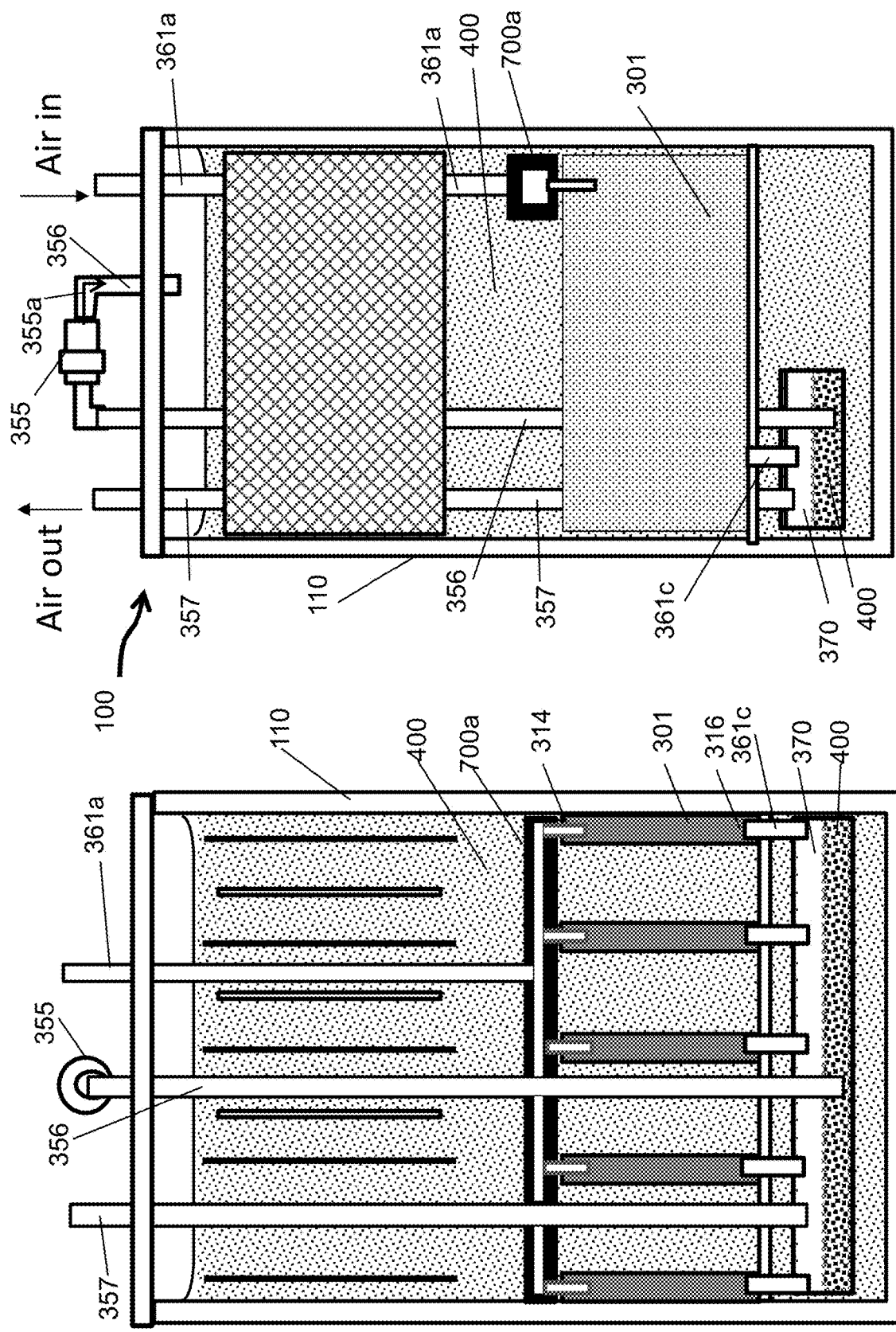
FIG. 13A shows an end view and FIG. 13B shows a side view of a plurality of air cathodes—including manifold configuration of liquid outlets and manifold arrangement of air inlets—installed as a discharging assembly in a variant configuration of the electrochemical cell system shown in FIG. 9F.

FIG. 13A shows an end view and FIG. 13B shows a side view of a plurality of air cathodes—including manifold configuration of air outlets and liquid outlets and manifold arrangement of air inlets—installed as a discharging assembly in a variant configuration of the electrochemical cell system shown in FIG. 9F.

Similar to FIG. 9F, FIGS. 13A and 13B illustrate an embodiment where reservoir 370 is placed inside the container 110 and tubing 361c is also placed inside container 110 connecting interior cavity 302 and the interior of reservoir 370. Tubing 361c connects with a port for combined air and liquid outlet 316 in air cathode 301, Tubing 361c provides a defined flow path to the reservoir 370 designated to collect electrolyte 400 drained from within interior cavity 302 of air cathode 301. Tubing 361c provides both air flow and liquid flow from interior cavity 302 of air cathode 301. Reservoir 370 is configured as a manifold to receive each tubing 361c from a plurality of air cathodes 301. Locating reservoir 370 and its communicative tubing inside container 110 provides an advantage of allowing any unintended leakage (for example, from the reservoir 370 or from tubing connections) to be contained inside container 110.

FIGS. 13A and 13B differ from FIG. 9F, in that tubing to exhaust air flow and to remove drained electrolyte from reservoir 370 as well as tubing to provide air flow to air inlet 314 passes through bores formed in a top lid of container 110 above the level of electrolyte 400. This arrangement of connecting tubing from respective inlets and outlets of the air cathodes to the exterior of container 110 requires greater lengths of tubing compared to the arrangement shown in FIG. 9F, but benefits from avoiding potential leakage of electrolyte from the bores in side walls of container 110 that could occur with the arrangement shown in FIG. 9F. More specifically, in this embodiment shown in FIGS. 13A and 13B, reservoir 370 is operably connected to tubing 356 and a pump 355 to actively flow the drained electrolyte collected in reservoir 370 against force of gravity and out of the top surface of container 110 in an ascending portion of tubing 356 and then back into container 110 in the direction of flow marked by arrow 355a in a descending portion of tubing 356. Ascending and descending portions of tubing 356 pass through bores formed in a top lid of container 110 for exit from and return to the interior of container 110, and because the bores are formed in the top lid above the electrolyte top surface, a sealing gasket is optional and need not be disposed within the bores to circumferentially seal tubing 356 to prevent electrolyte leakage. A tubing 357 connects the environment outside of the container 110 and the interior reservoir 370 and also passes through a bore formed in top lid of container 110 to exhaust air flow from the reservoir 370, and again a sealing gasket disposed within the bore to circumferentially seal tubing 357 is optional as the bore is above the electrolyte top surface. In this example, tubing 361c functions as both an air outlet and liquid outlet with the air entered in cavity 302 passing through 361c into the interior of reservoir 370 and then passing through tube 357 to the exterior of container 110. Tubing communicative with air inlets 314 of the plurality of air cathodes 301 (for example, 5 air cathodes shown in FIG. 13A) can each operably connect with manifold 700a which is equipped with a single tube 361a to extend through a bore in a top lid of container 110 to connect with an air pump as desired—again a sealing gasket disposed within the bore to circumferentially seal tubing 361a is optional as the bore is above the electrolyte top surface.

Figure 14:
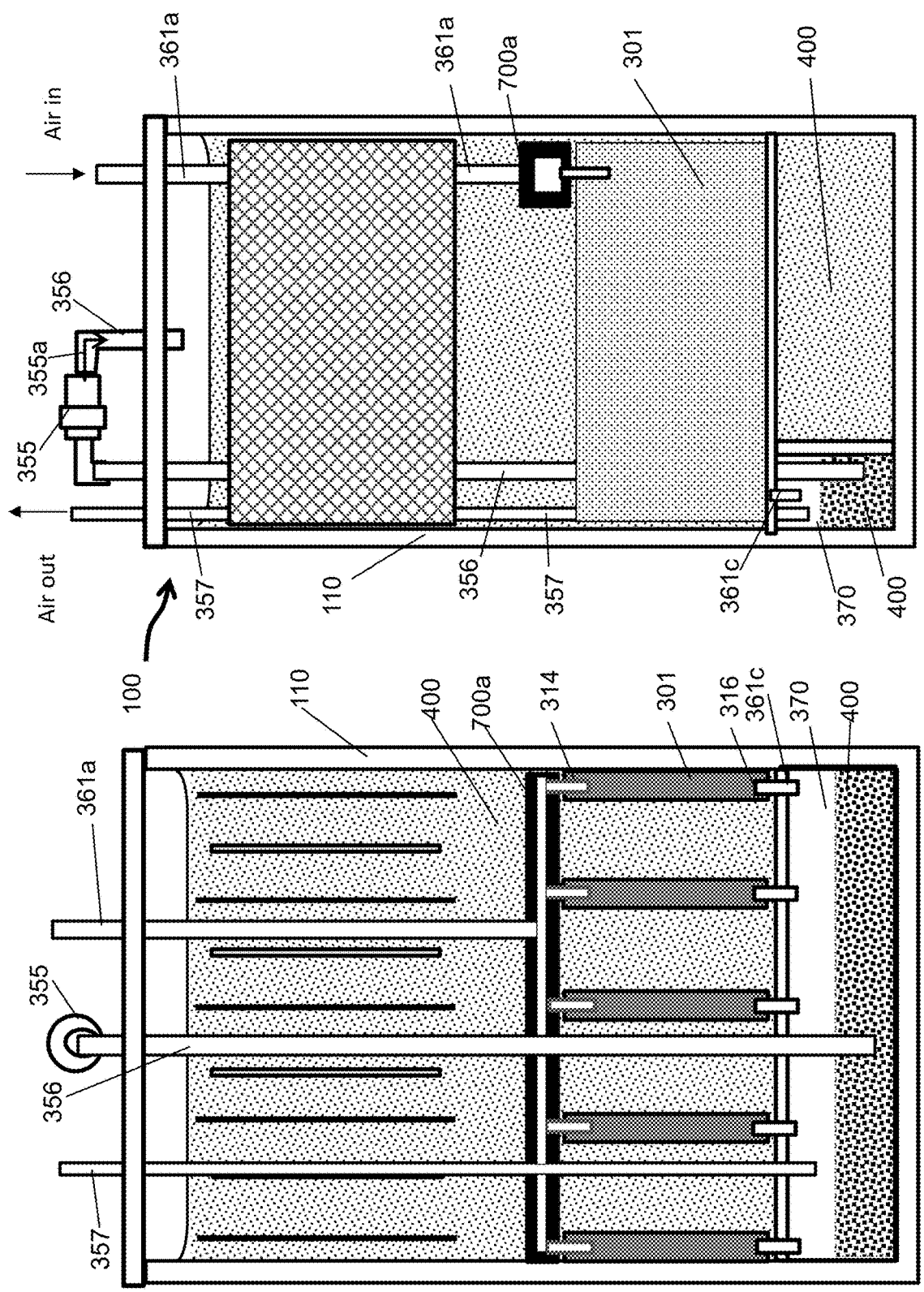
FIG. 14A shows an end view and FIG. 14B shows a side view of a variant configuration of the electrochemical cell system shown in FIGS. 13A and 13B.

FIG. 14A shows an end view and FIG. 14B shows a side view of a plurality of air cathodes—including manifold configuration of air outlets and liquid outlets and manifold arrangement of air inlets—installed as a discharging assembly in a variant configuration of the electrochemical cell system shown in FIGS. 13A and 13B. FIGS. 14A and 14B illustrate an embodiment that is similar to the embodiment shown in FIGS. 13A and 13B except that the manifold reservoir 370 is configured to abut and be co-extensive with a bottom side corner of container 110. FIGS. 13A and 13B and FIGS. 14A and 14B are similar in that the reservoir 370 provides a manifold for receiving air flow exhaust and drained electrolyte from the interior cavity of the air cathode. FIGS. 13A and 13B and FIGS. 14A and 14B differ in that FIGS. 13A and 13B shows the reservoir 370 constructed as a chamber component that is positioned and affixed between the bottom of the air cathode 301 and the bottom of the container 110 without abutting either of the bottom of the air cathode 301 or the bottom of the container 110, while FIGS. 14A and 14B show the reservoir 370 abutting both the bottom of air cathode 301 and the bottom of the container. Reservoir 370 shown in FIGS. 14A and 14B, may be constructed as desired to be an integrated formation of container 110 or to be a separate chamber component that is installed and affixed to the bottom side corner of the container 110.

Figure 15:
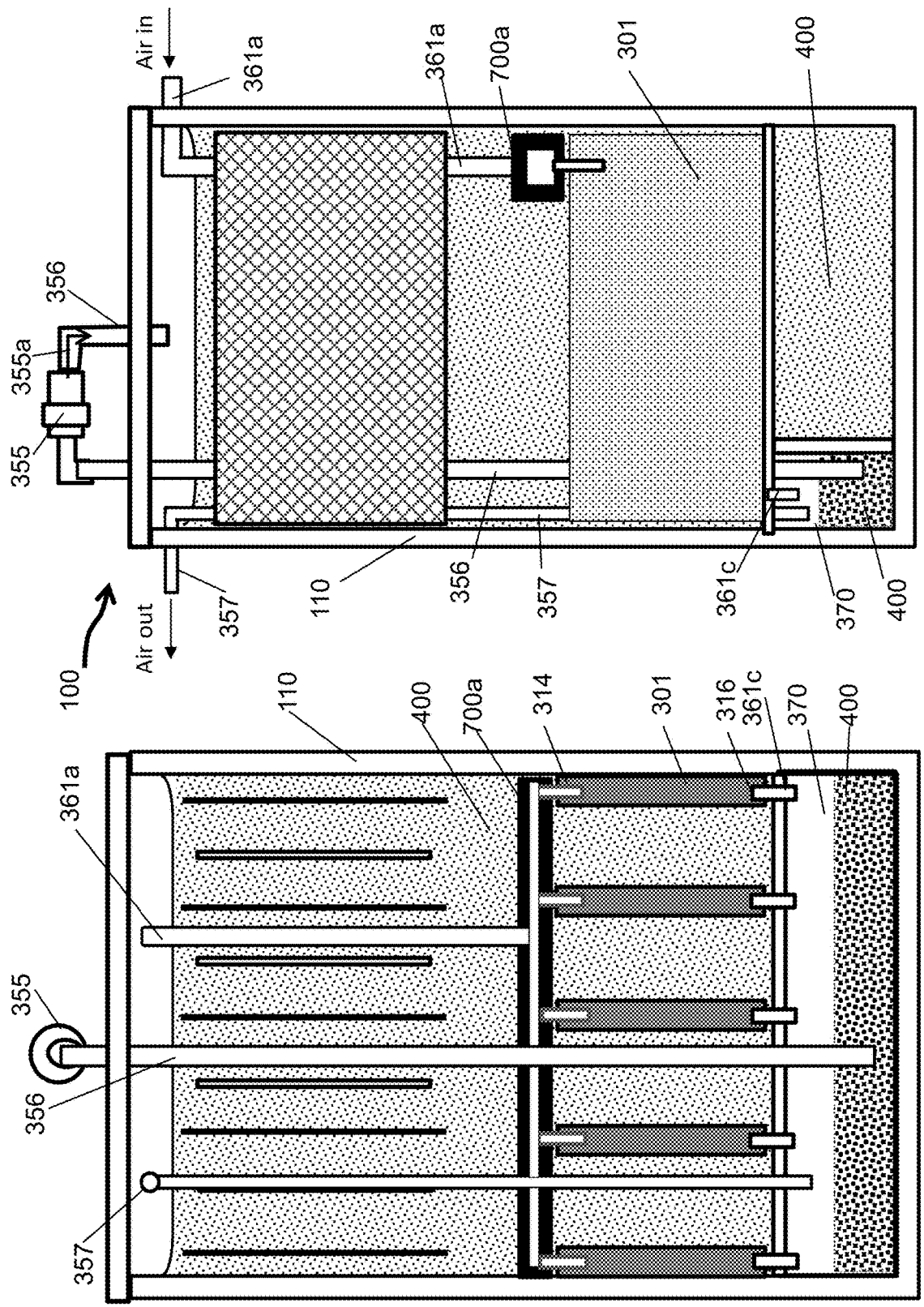
FIG. 15A shows an end view and FIG. 15B shows a side view of a variant configuration of the electrochemical cell system shown in FIGS. 14A and 14B.

FIG. 15A shows an end view and FIG. 15B shows a side view of a plurality of air cathodes—including manifold configuration of air outlets and liquid outlets and manifold arrangement of air inlets—installed as a discharging assembly in a variant configuration of the electrochemical cell system shown in FIGS. 14A and 14B. FIGS. 15A and 15B illustrate an embodiment that is similar to the embodiment shown in FIGS. 14A and 14B except that the air inlet tubing 361a and the air outlet tubing 357 ascend within the interior of container 110 and exit from the interior of the container 110 to the exterior of the container 110 through bores in the side wall of container 110 at a position in between the electrolyte and the top lid (ie., a position above the electrolyte 400 top surface and below the top lid of the container 110). manifold reservoir 370 is configured to abut and be co-extensive with a bottom side corner of container 110. Although the liquid outlet tubing 356 is shown to exit and re-enter the container 110 through the top lid, the liquid outlet tubing 356 and associated pump 355 may readily be configured to be positioned at a side wall similar to passage of tubing 357 or passage of tubing 361a through the side wall in between the electrolyte top surface and the top lid.

Many cells have been constructed with air cathodes having a liquid outlet providing a drainage hole at or near the bottom of the interior cavity of the air cathodes so as to drain the electrolyte that leaked into the interior cavity. The air cathodes of such cells have been found to function continuously over time without being affected by the leakage of electrolyte.

Several illustrative variants have been described above. Further variants and modifications are described below. Moreover, guiding relationships for configuring variants and modifications are also described below. Still further variants and modifications are contemplated and will be recognized by the person of skill in the art. It is to be understood that guiding relationships and illustrative variants or modifications are provided for the purpose of enhancing the understanding of the person of skill in the art and are not intended as limiting statements.

The air cathode 301 is distinguished by requiring an interior cavity 302 for air circulation, the interior cavity bound by interior surface of the border of a frame and by the interior surface of the membrane oxygen electrode.

The air cathode can be operational with air or any gas of suitable oxygen concentration (partial pressure).

The air cathode typically comprises an air inlet and an air outlet for passing air or an oxygen-containing gas into and out of the interior cavity. However, if desired for a particular implementation the air inlet and air outlet can be configured in a single connection in the air cathode, for example, when pressurized air is provided as a duty cycle and escape of air occurs passively during an off portion of the duty cycle, or when air circulation is provided by a programmable reversible air pump.

The air inlet and the air outlet can be independently connected to be communicative with any one or more of conventional air flow control devices, such as fans, air exchangers, air pumps, heat exchangers, dampers, valves, filters, sensors, dehumidifiers, moisture/water traps, regulators, or any other device for treatment of air, so that each of the air inlet and the air outlet are communicative with a separate air flow control device or separate combination of air control devices. Alternatively, the air outlet and the air inlet can be connected to the same one or more air flow control devices so that control of air flow out of the air outlet and air flow into the air inlet is controlled by common single or combination of air control devices. As a further option, if the air inlet and air outlet are connected to common air control device(s), then at least part of the air flow from the air outlet may be directed to the air inlet to create an air flow loop.

The air cathode may comprise a liquid outlet to drain electrolyte that leaks into the interior cavity. Although not routine, leakage of electrolyte into the interior cavity may occur due to defects or weak spots at the time of manufacture or due to damage/erosion from extended operation, as for example a defect or weak spot in the membrane oxygen electrode surface, a defect or weak spot in sealed attachment of the membrane oxygen electrode to the air cathode frame or a defect or weak spot in a seal of tubing though an inlet or outlet of the air cathode. The liquid outlet is not limited to a particular shape or configuration, except that it is positioned at the same level or lower than at least one of the air inlet and the air outlet. Typically, the liquid outlet is positioned at the same level or lower than both the air inlet and the air outlet. Typically, the liquid outlet is positioned lower than the air inlet. Often, the liquid outlet is positioned at or near the bottom of the air cathode. As electrolyte leaking into the interior cavity is drawn down by gravity, positioning the liquid outlet at the same level or lower than the air inlet and air outlet ensures that an accumulated level of electrolyte leakage does not interfere with air flow at the air inlet or air outlet. Similarly, positioning the liquid outlet at or near the bottom of the air cathode can minimize accumulation of leaked electrolyte that drips to the bottom of the air cathode by gravitational force. As the purpose of the liquid outlet is to drain unintended electrolyte leakage from within the interior cavity, the air cathode will be devoid of a designated liquid inlet communicative with the interior cavity.

Dimensions of the liquid outlet may differ from dimensions of the air inlet consistent with dimensions useful to achieve effective flow of liquid as compared to gaseous material. For example, a diameter of the liquid outlet may be from about 2 millimeter (mm) to about 20 mm, while a diameter of the air inlet may be from about 0.2 mm to about 10 mm. Similarly, dimensions of the liquid outlet may differ from dimensions of the air outlet, when the liquid outlet and the air outlet are two different and distinct outlets. When the air outlet is distinct from the liquid outlet, the air outlet dimensions can be similar to dimensions for the air inlet, including for example a diameter of the air outlet ranging from about 0.2 mm to about 10 mm. When the air outlet and the liquid outlet are the same outlet, the dimensions of the air outlet will typically follow dimensions useful to achieve effective flow of liquid.

Any convenient ridge or gutter shape and orientation may be installed within the interior cavity to direct leaked electrolyte towards the liquid outlet.

Frame 310 and its variants shown in the drawings, are generally rectangular for the purpose of illustration only. Frame 310 need not be limited to a rectangular shape, and other shapes such as concave, convex, triangular, elliptical profiles are readily feasible. Frame 310 can have many variations and each variant can have many configurations provided that sufficient support shaped as the semi-cylindrical convex top surface is provided for an inverted U-shaped or convex-shaped bend of the membrane oxygen electrode. The semi-cylindrical convex top surface may be a single continuous surface as in frame 310a for example (with optional windows 320, gaps, perforations, vent gratings, and the like) or multiple co-aligned surfaces as in frame 310, 310b or 310c as examples.

Ridges and primary support bars need not be rectangular—and could be triangular, elliptical, or any other profile as desired. Furthermore ridges and support bars need not be symmetric, as many asymmetric shapes are possible. Ridges and bars may be substituted with other support structures for example first and second vent grates that extend across first and second sides, respectively, of the interior of border 312, each of first and second vent grates providing a 90 degree curve at a top end to co-operate to form a semi-cylindrical convex top surface to provide abutting support for the membrane oxygen electrode along opposing side surfaces and a U-shaped or covex-shaped bend between the opposing side surfaces.

The border of the frame need not be rectangular, and many different shapes are feasible for both its radial cross-section as well as its overall profile. The border of the frame can be shaped as desired to accommodate a particular implementation, for example with/without liquid outlet, or with/without indents to receive manifolds.

The border of the frame will typically house the air inlet, the air outlet and/or the liquid outlet. Inlets and outlets provide an interface for a defined communicative flow path between an exterior of the air cathode and an interior cavity of the air cathode. Inlets and outlets can be shaped as desired and optionally equipped with sealing gaskets to prevent leakage through the inlet or outlet. Sealing gaskets may be any sealing structure including for example a sealing ring, or any other sealing material configured to sufficiently prevent or reduce leakage through the inlet or outlet. Sealing gaskets may be made of any suitable water impermeable material including polymers, natural products, or combinations thereof.

The inlets or outlets may also be optionally equipped with any conventional component of flow conduits such as valves, filters, sensors, moisture/water traps, regulators and the like.

The frame components such as border, base plate, ridges and support bars may be manufactured as a single piece or as separate components as desired. The frame components may be made of the same material or separate materials as desired. Frames may be manufactured in accordance with conventional materials and general available methods of frame construction.

Many different membrane oxygen electrodes and separators may find use within the air cathode, and therefore the air cathode is not limited to any particular type of membrane oxygen electrode or separator, and may accommodate any combination of membrane oxygen electrode and separator.

Benefits provided by solutions described herein include for example, improved performance of an electrochemical cell. In absence of a leakage draining solution, electrolyte leakage into air cathode can accumulate electrolyte within the interior cavity of the air cathode compromising a discharging reaction and reducing current generation, thereby reducing performance. Presence of a leakage draining solution provides an interior cavity in which electrolyte accumulation is minimized or reduced so as to maintain current generation from the discharging reaction. Another example of a benefit is improved longevity of the electrochemical cell. In absence of a leakage draining solution, accumulation of leaked electrolyte into the interior cavity of air cathodes can compromise performance to the extent that the electrochemical cell must be taken offline and refurbished with new air cathodes. Presence of a leakage draining solution provides air cathodes that maintain sufficiently reduced levels of leaked electrolyte so as to maintain operation of the electrochemical cell for a longer time frame. Another example of a benefit is a reduced time and cost of maintenance. In absence of a leakage draining solution, air cathodes must be checked for leakage upon noting a drop in performance and leaking air cathodes must be replaced—identifying leaking air cathodes and installing replacements can be time consuming and over time can result in a significant operational cost. Presence of a leakage draining solution allows for operation of an electrochemical cell without the time and cost needed to identify and replace leaking air cathodes. The leakage draining solution allows for greater tolerance of defect or weak spots, and therefore manufacturing production yield.

Solutions described herein to reduce or alleviate leakage of electrolyte may provide benefits individually or in any combination.

Solutions described herein relate to an air cathode configured to reduce or alleviate electrolyte leakage. In a first illustrative example of an air cathode, the air cathode may comprise: a frame; a membrane oxygen electrode attached to the frame to define an interior cavity; an air inlet communicative with the interior cavity; an air outlet communicative with the interior cavity; a liquid outlet communicative with the interior cavity; and the liquid outlet positioned lower than the air inlet.

Optionally in the air cathode, the frame comprises a border, the border housing the air inlet, the air outlet, and the liquid outlet. The border may comprise a bottom arm and first and second vertical side arms extending from opposing ends of the bottom arm. The border may comprise first and second opposing top overhangs extending co-axially inward from corresponding top ends of first and second vertical side arms. The border may comprise a top arm connecting corresponding top ends of first and second vertical side arms. The liquid outlet may be formed in the border at or near the bottom arm. The air inlet may be formed in one of the first and second opposing top overhangs. Alternatively, the air inlet may be formed in the border at or near the top arm.

Optionally in the air cathode, the frame comprises a base plate connected to opposing interior surfaces of a border of the frame, and a ridge extending perpendicularly from the base plate, the ridge oriented to direct liquid towards the liquid outlet. As another option, the frame comprises a gutter connected to an interior surface of a bottom border of the frame, an end of the gutter communicative with the liquid outlet.

Typically, in the air cathode, the liquid outlet is positioned lower than the air outlet. In some examples, the air outlet and the liquid outlet is the same. In an example, the diameter of the liquid outlet is between 2 mm to 10 mm. In a more specific example of the air cathode, the diameter of the air inlet is between 0.2 mm to 5 mm.

In a second illustrative example of an air cathode, the air cathode may comprise: a frame comprising a convex top surface; a single membrane oxygen electrode attached to first and second opposing sides of the frame and attached to the convex top surface in between the first and second opposing sides of the frame to define an interior cavity; an air inlet communicative with the interior cavity; an air outlet communicative with the interior cavity.

Optionally in the air cathode, the frame comprises a border, the border housing the air inlet, and the air outlet. As another option, the border may comprise a bottom arm and first and second vertical side arms extending from opposing ends of the bottom arm, the top ends of the first and second vertical side arms having a convex shape. Alternatively, the border may comprise first and second opposing top overhangs extending co-axially inward from corresponding top ends of first and second vertical side arms, the top surfaces of the first and second opposing top overhangs having a convex shape. Alternatively, the border may comprise a top arm connecting corresponding top ends of first and second vertical side arms, the top surface of the top arm having a convex shape.

Optionally, in the air cathode, the frame comprises a base plate connected to opposing interior surfaces of the border, and a plurality of ridges extending from the base plate, each of the plurality of ridges having a curved top edge that forms part of the convex top surface.

Solutions described herein relate to an electrochemical cell system configured to reduce or alleviate electrolyte leakage of air cathodes. In a first illustrative example of an electrochemical cell system, the electrochemical cell system may comprise: a housing; an electrolyte disposed in the housing; a metallic material, when positioned in the first spaces, forms one or more discharging anodes; one or more charging anodes and one or more charging cathodes at least partially immersed in the electrolyte; and one or more air cathodes immersed in the electrolyte and one or more first spaces between the oxygen cathodes, each of the one or more air cathodes comprising 1) a frame, 2) a membrane oxygen electrode attached to the frame to define an interior cavity, 3) an air inlet communicative with the interior cavity, 4) an air outlet communicative with the interior cavity, 5) a liquid outlet communicative with the interior cavity, 6) the liquid outlet positioned lower than the air inlet.

In a second illustrative example of an electrochemical cell system, the electrochemical cell system may comprise: a housing; an electrolyte disposed in the housing; a plurality of oxygen cathodes immersed in the electrolyte and a plurality of first spaces between the oxygen cathodes, each of the oxygen cathodes comprising 1) a frame, 2) a membrane oxygen electrode attached to the frame to define an interior cavity, 3) an air inlet communicative with the interior cavity, 4) an air outlet communicative with the interior cavity, 5) a liquid outlet communicative with the interior cavity, 6) the liquid outlet positioned lower than the air inlet; a metallic material, when placed in the first spaces, forms one or more discharging anodes; and a second space above the discharging cathodes for storing the excess metallic material when the first space is filled.

In a third illustrative example of an electrochemical cell system, the electrochemical cell system may comprise: a housing; an electrolyte disposed in the housing; a plurality of oxygen cathodes immersed in the electrolyte and a plurality of first spaces between the oxygen cathodes, each of the oxygen cathodes comprising 1) a frame, 2) a membrane oxygen electrode attached to the frame to define an interior cavity; a mechanism for drainage of electrolyte leaked into the interior cavity of oxygen cathodes comprising 1) a reservoir, 2) an outlet communitive with the interior cavity and with the reservoir, 3) a pump communitive with the reservoir and with the housing through a tubing; a metallic material, when placed in the first spaces, forms one or more discharging anodes; and a second space above the discharging cathodes for storing the excess metallic material when the first space is filled.

In a fourth illustrative example of an electrochemical cell system, the electrochemical cell system may comprise: a container housing the electrochemical cell system; an electrolyte disposed in the container; a plurality of air cathodes immersed in the electrolyte and a plurality of first spaces between the air cathodes, each of the air cathodes comprising 1) a frame, 2) a membrane oxygen electrode attached to the frame to define an interior cavity, 3) an air inlet communicative with the interior cavity, 4) an air outlet communicative with the interior cavity; a mechanism for drainage of electrolyte leaked into the interior cavity of air cathodes comprising 1) a reservoir, 2) a liquid outlet communitive with the interior cavity and with the reservoir, 3) a pump communitive with the reservoir and with the housing through a tubing; a metallic material, when placed in the first spaces, forms one or more discharging anodes; and a second space above the air cathodes for storing the excess metallic material when the first space is filled.

Optionally, in the electrochemical cell system, the frame of each air cathode comprises a base plate connected to opposing interior surfaces of a border of the frame, and a ridge extending perpendicularly from the base plate, the ridge oriented to direct liquid towards the liquid outlet.

In another option for the electrochemical cell system, the frame of each air cathode comprises a gutter connected to an interior surface of a bottom border of the frame, an end of the gutter communicative with the liquid outlet.

In further options for configuring air cathodes in the electrochemical cell system, the liquid outlet is positioned lower than the air outlet. In certain examples, the air outlet and the liquid outlet is the same. In other examples, the liquid outlet is positioned at or near the bottom of each air cathode. In further examples, the air inlet and the liquid outlet are formed in a border of the frame.

Solutions described herein can be implemented as a method. In a first example of method, a method for drainage of liquid within an air cathode in an electrochemical cell system may comprise configuring an air cathode comprising a liquid outlet as described herein within an electrochemical cell system, and draining liquid through the liquid outlet.

In a second example of method, a method for drainage of liquid within an air cathode in an electrochemical cell system may comprise configuring an air cathode within an electrochemical cell system, the air cathode comprising a sealed interior cavity, an air inlet communicative with the interior cavity, a liquid outlet communicative with the interior cavity, the liquid outlet positioned lower than the air inlet, and draining liquid through the liquid outlet.

In a third example of a method, a method for drainage of liquid within an air cathode may comprise configuring an air cathode comprising a liquid outlet as described herein, and draining liquid through the liquid outlet.

In a fourth example of a method, a method for drainage of liquid within an air cathode may comprise configuring an air cathode with a frame, a membrane oxygen electrode attached to the frame to define an interior cavity, an air inlet communicative with the interior cavity, a liquid outlet communicative with the interior cavity, the liquid outlet positioned lower than the air inlet, draining liquid through the liquid outlet.

In a fifth example of a method, a method for electrolyte leakage management in an electrochemical cell system may comprise configuring a plurality of air cathodes within an electrochemical cell system, each of the plurality of air cathodes comprising a frame, a membrane oxygen electrode attached to the frame to define a sealed interior cavity, an air inlet communicative with the interior cavity, a liquid outlet communicative with the interior cavity; positioning the liquid outlet lower than the air inlet; and draining electrolyte leakage from the interior cavity through the liquid outlet.

Figure 16:
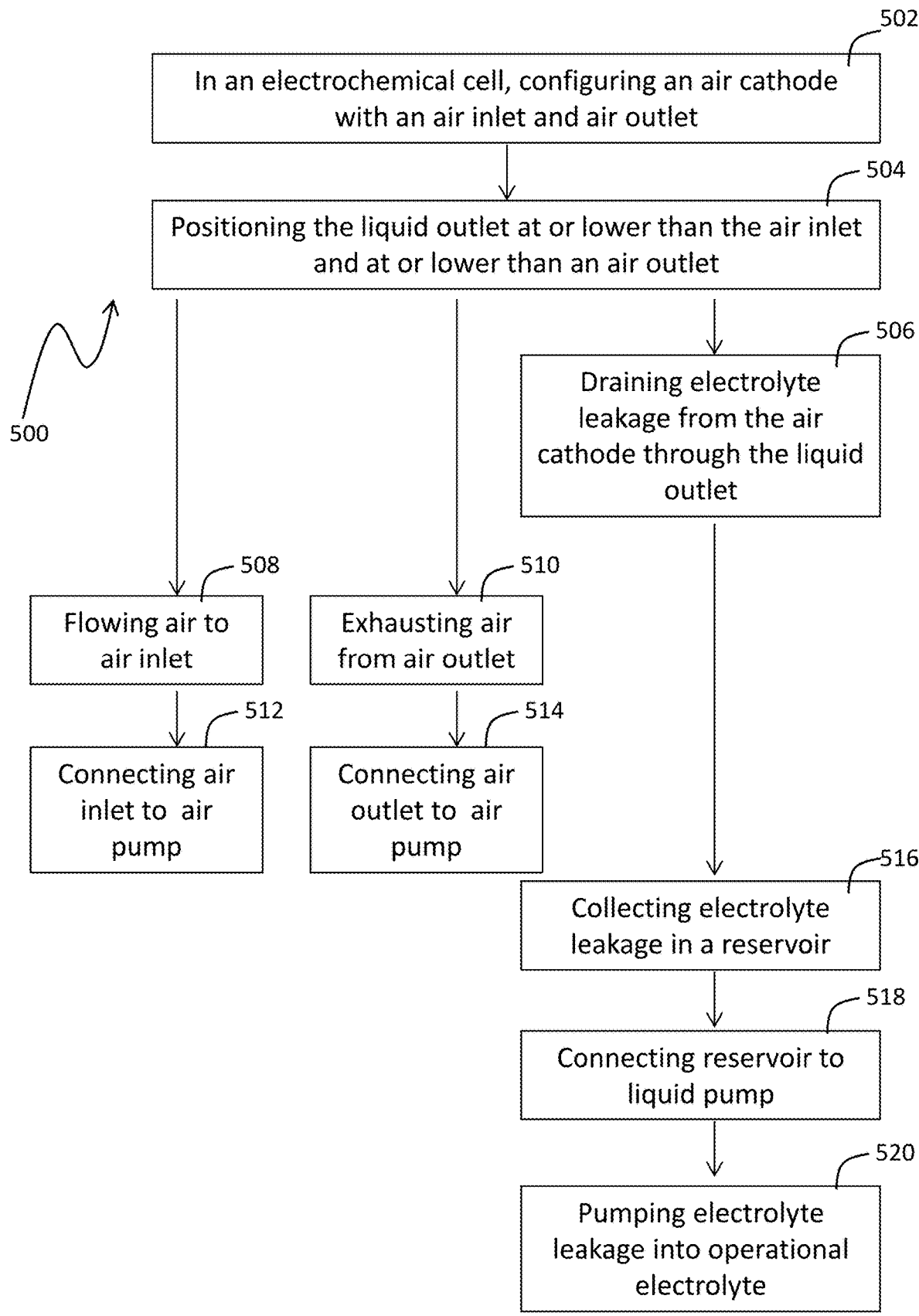
FIG. 16 shows a block diagram of an illustrative example of a method of electrolyte leakage management in an electrochemical cell.

Methods include core features of configuring an air cathode defining an interior cavity with both an air inlet and a liquid outlet communicative with the interior cavity (502), positioning the liquid outlet at or lower than the air inlet (504), and draining electrolyte leakage from the interior cavity of the air cathode through the liquid outlet (506) as schematically indicated for an illustrative method example (500) shown in FIG. 16.

Methods optionally further comprise positioning an air outlet at or above the liquid outlet. Methods optionally further comprise positioning the air outlet at a same level as the liquid outlet, with a further alternative being that the liquid outlet and the air outlet are coincident and coextensive so as to form a combined liquid and air outlet. Methods optionally further comprise positioning the liquid outlet at or near the bottom of the air cathode. Methods optionally further comprise forming the air inlet and the liquid outlet are formed in a border of the frame of the air cathode.

Methods optionally further comprise flowing air to the air inlet (508) from an exterior of a container housing the electrochemical cell system and exhausting air from the air outlet (510) to an the exterior of the container. Air flow to the air inlet, and exhaust from the air outlet can be achieved through any suitable mechanism including, for example, connecting the air inlet to an air pump (512) and connecting the air outlet to an air pump (514). The air inlet and the air outlet may be independently communicative with different air pumps, or in other examples the air inlet and the air outlet may be communicative with the same air pump.

Methods optionally further comprise collecting the electrolyte leakage drained from the interior cavity through the liquid outlet into a reservoir (516) that is isolated from an operational body of electrolyte circulating within a container housing the electrochemical cell. The reservoir may be located within an interior of the container of the electrochemical cell system for a desired implementation. The reservoir may be located exterior to the container of the electrochemical cell system for a desired implementation. Methods optionally further comprise configuring the reservoir as a manifold to receive and collect the electrolyte leakage drained from all of the plurality of air cathodes.

Methods optionally further comprise pumping the drained electrolyte leakage out from the reservoir with a pump communicative with the reservoir (518), and optionally the drained electrolyte leakage is pumped out from the reservoir and into the operational body of electrolyte circulating within the container (520). Alternatively, methods optionally further comprise pumping the drained electrolyte leakage out from the interior cavity of the air cathode with a pump communicative with the liquid outlet of the air cathode, and optionally the drained electrolyte leakage is pumped out from the interior cavity of the air cathode and into the operational body of electrolyte circulating within the container.

Collecting drained electrolyte leakage in a reservoir or manifold and adding the collected electrolyte leakage to the operational body of electrolyte benefits both electrolyte leakage management of air cathodes and maintaining suitable volume of the operational body of electrolyte. As such, methods comprising a step of collecting liquid drained from the liquid outlet in a reservoir or manifold communicative with the liquid outlet and a step of pumping liquid out from the reservoir with a pump communicative with the reservoir offer a convenient recycling of electrolyte leakage compared to a method of draining electrolyte leakage to a disposal unit. Methods may optionally comprise a step of pumping liquid out from the reservoir and into a cell container of the electrochemical cell system. Methods may optionally comprise a step of pumping liquid out from the interior cavity of the air cathode with a pump communicative with the liquid outlet of the air cathode. Methods may optionally comprise a step of pumping liquid out from the interior cavity of the air cathode and into a cell container of the electrochemical cell system. The step of pumping liquid out from the reservoir or the interior cavity of the air cathode may have any convenient cyclic or acyclic repetitive occurrence as desired for a specific implementation.

Directional terms such as lower, upper, vertical, horizontal, perpendicular, parallel, incline, decline, direction of gravity, ascending, descending, above, below, top, bottom, side, front, rear, are intended to be interpreted in context of the air cathode in an electrochemical cell in an operational position and configuration as shown for example in FIG. 1.

Approximating terms such as generally and substantially are intended to describe variation that is close or near to a desired value or target, and such terms are intended to encompass variation that is at or near a desired value or target.

Embodiments described herein are intended for illustrative purposes without any intended loss of generality. Still further variants, modifications and combinations thereof are contemplated and will be recognized by the person of skill in the art. Accordingly, the foregoing detailed description is not intended to limit scope, applicability, or configuration of claimed subject matter.

What is claimed is:

1. An electrochemical cell comprising an air cathode, the air cathode comprising:
    a frame;
    a membrane oxygen electrode attached to the frame to define a sealed interior cavity;
    an air inlet communicative with the interior cavity; and,
    a liquid outlet communicative with the interior cavity and positioned lower than the air inlet,
wherein the electrochemical cell further comprises a container containing an operational body of electrolyte and wherein electrolyte leakage from the operational body of electrolyte into the interior cavity drains through the liquid outlet, wherein the liquid outlet is communicative with a reservoir beneath the liquid outlet, wherein the reservoir is located within an interior of the container.

2. The electrochemical cell according to claim 1, wherein the air cathode further comprises an air outlet positioned above the liquid outlet.

3. The electrochemical cell according to claim 1, wherein the liquid outlet is positioned at or near a bottom of the air cathode.

4. The electrochemical cell according to claim 1, wherein the electrochemical cell comprises a plurality of air cathodes.

5. The electrochemical cell according to claim 1, wherein the electrochemical cell comprises a plurality of air cathodes, each air cathode comprising a liquid outlet, and wherein the reservoir comprises a manifold connected to each liquid outlet of the plurality of air cathodes.

6. The electrochemical cell according to claim 1, further comprising a pump communicative with the reservoir, the pump configured to transfer electrolyte leakage from the reservoir to the operational body of electrolyte.

7. The electrochemical cell according to claim 1, wherein the frame comprises a convex top surface and wherein the membrane oxygen electrode is attached to first and second opposing sides of the frame and attached to the convex top surface in between the first and second opposing sides of the frame.

8. The electrochemical cell according to claim 1, wherein the operational body of electrolyte is above the air cathode.

* * * * *